（12）United States Patent
Nicklas

(10) Patent No.: US 9,010,532 B2
(45) Date of Patent: *Apr. 21, 2015

(54) BOX FOR WELDING WIRE

(75) Inventor: James C. Nicklas, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 13/486,181

(22) Filed: Jun. 1, 2012

(65) Prior Publication Data

US 2012/0234713 A1 Sep. 20, 2012

Related U.S. Application Data

(63) Continuation of application No. 11/345,772, filed on Feb. 2, 2006, now Pat. No. 8,245,846.

(51) Int. Cl.
| B65D 85/04 | (2006.01) |
| B21C 47/18 | (2006.01) |
| B23K 9/133 | (2006.01) |
| B65H 49/08 | (2006.01) |
| B65H 57/18 | (2006.01) |

(52) U.S. Cl.
CPC ............... B65D 85/04 (2013.01); B21C 47/18 (2013.01); B23K 9/133 (2013.01); B23K 9/1333 (2013.01); B65H 49/08 (2013.01); B65H 57/18 (2013.01); B65H 2701/36 (2013.01)

(58) Field of Classification Search
USPC .......... 206/409, 395, 389; 242/146, 170, 171, 242/169, 129.72
See application file for complete search history.

(56) References Cited

U.S. PATENT DOCUMENTS

| 1,640,368 | A | * | 8/1927 | Obetz et al. ................... 206/409 |
| 1,668,800 | A | * | 5/1928 | Bonfield ................... 229/117.14 |
| 1,795,672 | A | | 3/1931 | Plummer |
| 1,936,227 | A | * | 11/1933 | Cook .......................... 242/137.1 |
| 2,559,759 | A | | 7/1951 | De Swart |
| 2,713,938 | A | * | 7/1955 | Snyder .......................... 206/395 |
| 2,974,850 | A | * | 3/1961 | Mayer .......................... 206/409 |
| 3,823,894 | A | | 7/1974 | Frederick et al. |
| 3,982,712 | A | | 9/1976 | Bassett |
| 4,373,687 | A | * | 2/1983 | Zicko .......................... 242/163 |
| 4,623,063 | A | | 11/1986 | Balkin |
| 5,494,160 | A | | 2/1996 | Gelmetti |
| 5,979,812 | A | * | 11/1999 | Kotzur et al. ................. 242/163 |
| 6,481,575 | B2 | | 11/2002 | Cipriani |
| 6,564,943 | B2 | | 5/2003 | Barton et al. |
| 6,715,608 | B1 | | 4/2004 | Moore |
| 7,007,799 | B2 | * | 3/2006 | Cote ............................ 206/409 |
| 2002/0125161 | A1 | * | 9/2002 | Cote ............................ 206/408 |
| 2005/0258290 | A1 | | 11/2005 | Kuper |

* cited by examiner

Primary Examiner — Jacob K Ackun
Assistant Examiner — Jenine Pagan
(74) Attorney, Agent, or Firm — Hahn, Loeser & Parks LLP

(57) ABSTRACT

A box for shipping and dispensing a welding wire wound into a generally cylindrical mass having a cylindrical core cavity concentric with a vertical axis. The box has four sidewalls with an integral generally triangular flap where at least one of the flaps has an upper generally square crown section with a wire outlet opening. The flaps have a folded down position wherein they overlap each other in a flat plane above the wire mass and an assembled up position defining a four sided pyramid shaped tent above the wire mass, with the crown section assembled in a plane generally parallel to the flat plane and at least 6.0 inches above the flat plane with the wire outlet opening aligned with the axis.

7 Claims, 23 Drawing Sheets

BOX FOR WELDING WIRE

CROSS-REFERENCE TO RELATED APPLICATIONS

This application is a Continuation of U.S. application Ser. No. 11/345,772, which was filed on Feb. 2, 2006, and claims the benefit thereto, the disclosure of which is incorporated herein its entirety by reference.

TECHNICAL HELD

The present invention relates to electric arc welding and more particularly to a container in the form of a box for shipping and dispensing welding wire for use in a welding operation.

BACKGROUND OF THE INVENTION AND INCORPORATION BY REFERENCE

Mass production of various assemblies involves electric arc welding that pulls welding wire from a container during the welding operation. To supply a continuous wire for the welding operation, containers of wound welding wire are loaded at the wire manufacturer, sealed, shipped and then loaded onto the dispensing mechanism of the automatic welding operation. In the past, large masses of wound welding wire were normally provided in cylindrical drums formed from diverse materials. These drums have been replaced in many instances by cardboard boxes, such as shown in Gelmetti U.S. Pat. No. 5,494,160, Cipriani U.S. Pat. No. 6,481,575 and Barton U.S. Pat. No. 6,564,943. These patents are incorporated by reference as background information showing cardboard boxes for shipping bulk continuous welding wire. At the welding operation, the shipping box is opened and provided with an upper dispensing "hat", as shown in Gelmetti U.S. Pat. No. 5,494,160 and Cipriani U.S. Pat. No. 6,481,575. A hat may be shipped with the box, but it is normally a standard structure retained at the welding facility and used with several boxes as they are conditioned for the dispensing procedure. Thus, it is common practice to provide a box for bulk welding wire that is combined with a hat for dispensing wire. The present invention relates to a hat formed by structural elements forming a part of the shipping box itself. In the past, the dispensing drum has been provided with an integral hat, as shown in Moore U.S. Pat. No. 6,715,608. This patent is incorporated by reference herein as showing a hat associated with a specific drum and shipped with the drum so that it can be shifted into a dispensing position at the welding operation. This patent is incorporated by reference herein as background to the present invention.

SUMMARY OF THE INVENTION

Welding wire drums are sometimes undesirable since they are normally formed from a combination of fiber board and metal which is not easily reclaimed and/or is not biodegradable. For this and other reasons, the drum for bulk continuous welding wire is being replaced by some customers with cardboard boxes as shown in Barton U.S. Pat. No. 6,564,943. These boxes are used to ship the bulk welding wire and require installation of a rigid hat at the welding operation. The hat converts the box from a shipping container to a dispensing container. The present invention involves a standard cardboard box modified to combine the shipping capability with the wire dispensing capability. This is done by providing integrally formed cardboard elements that are assembled into a wire dispensing hat at the welding operation. In this manner, shipping and dispensing functions are performed by cardboard elements that can be easily reclaimed after use. There is no need to inventory associated hats or provide dispensing hats at the various welding facilities. Consequently, the present invention is a combined shipping and wire dispensing box formed from a single sheet of rigid material, such as corrugated cardboard. The box is easily converted to a dispensing container at the welding operation. The invention is primarily applicable to automatic welding operation; however, a box using the invention is equally useable for semi-automatic welding.

In accordance with the present invention there is provided a box for shipping and dispensing a welding wire wound into a generally cylindrical mass having a cylindrical core cavity concentric with a vertical axis. This box has a number of sidewalls defining a wire receiving compartment with a lateral, polygonal cross-sectional shape and at least two flaps. Each flap is connected to the top of a sidewall and has an elongated flat body with at least one of the flaps having an integrally formed crown section containing a wire outlet opening. The two flaps on the parallel sidewalls have a folded down position extending across the polygonal shape and overlapping each other above the wire and an assembled position with the flaps connected into a tent configuration fixing the crown section in a horizontal plane above the wire mass with the wire opening aligned with the axis. Preferably the box is square and has four separate, truncated triangular flaps, wherein the tent configuration is a four sided pyramid with a square open crown area greater than 6.0 inches and preferably greater than 12.0 inches above the top of the box.

In accordance with another aspect of the present invention, each of the sidewalls has a flap and there are two or more crown sections on the end of the flaps. The crown sections are stacked and held together to assemble the flaps into the pyramid shape. In accordance with one aspect of the invention, the crown sections are held together by an adhesive and in another aspect of the present invention they are held together by a tubular grommet extending through the wire openings of the overlapped crown sections. The tubular grommet has a lower fixed shoulder and a spaced camming shoulder to capture the crown sections between the shoulders so the grommet can guide the wire as it is dispensed.

In accordance with another aspect of the invention, the tent configuration of the upstanding assembled position of the flaps is a pyramid or right angle box shape.

In accordance with another embodiment of the invention, the box has a single flap with first and second elongated body sections with an intermediate integrally formed crown section having a wire outlet opening. The first body sections being attached to one of the sidewalls and the second body section having a distal edge so the distal edge can be connected to the top edge of an opposed parallel sidewall to define the assembled tent configuration. In this embodiment a single flap is folded down for shipping and assembled for wire distribution.

In accordance with another aspect of the present invention, the flaps are generally triangular with the crown section at the apex or the truncated top of at least one of the flaps. The flaps have outer edges with the edges of adjacent flaps generally abutting in the flat down position. In accordance with an aspect of the invention, there are interengaging elements along the abutting edges of the adjacent flaps to hold the abutting edges together.

In accordance with still a further aspect of the present invention, the crown area between the assembled flaps is square and the crown section is square with at least two interlocking tabs coacting with aligned slits in the top of the three flaps not having a crown section, whereby the crown section is locked in the square opening by the tabs and holds the flaps in the dispensing assembled position.

Still a further aspect of the present invention the square crown area defining the flaps in the assembled position is filled by a square crown section that includes adhesive lips coacting with aligned adhesive lips on the truncated top of the flaps not having a crown section, whereby the crown section is locked to the square opening by the coacting adhesive lips to hold the flaps in the assembled dispensing position.

The primary object of the present invention is the provision of a box for a mass of welding wire, which box is both a shipping container and a dispensing container.

Another object of the present invention is the provision of a box, as defined above, which box is formed from a single sheet of cardboard that is easily reclaimed and/or biodegradable.

Yet another object of the present invention is the provision of a box, as defined above, which box can be easily converted from a shipping container to a dispensing container for bulk welding wire.

Still a further object of the present invention is the provision of a box as defined in the appended claims.

These and other objects and advantages will become apparent from the following description taken together with the accompanying drawings.

DETAILED DESCRIPTION

Figure 1:
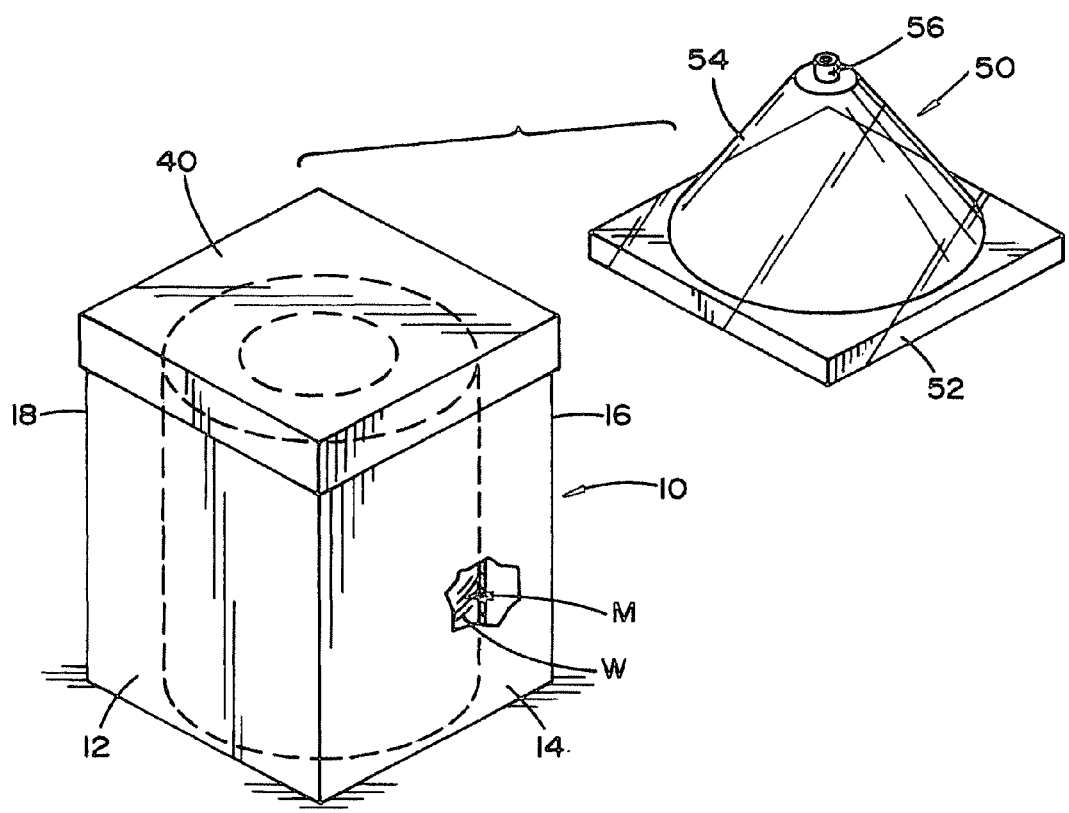
FIGS. 1-3 are pictorial views of the prior art cardboard box for shipping bulk continuous welding wire from the manufacturer to the welding facility.
Figure 2:
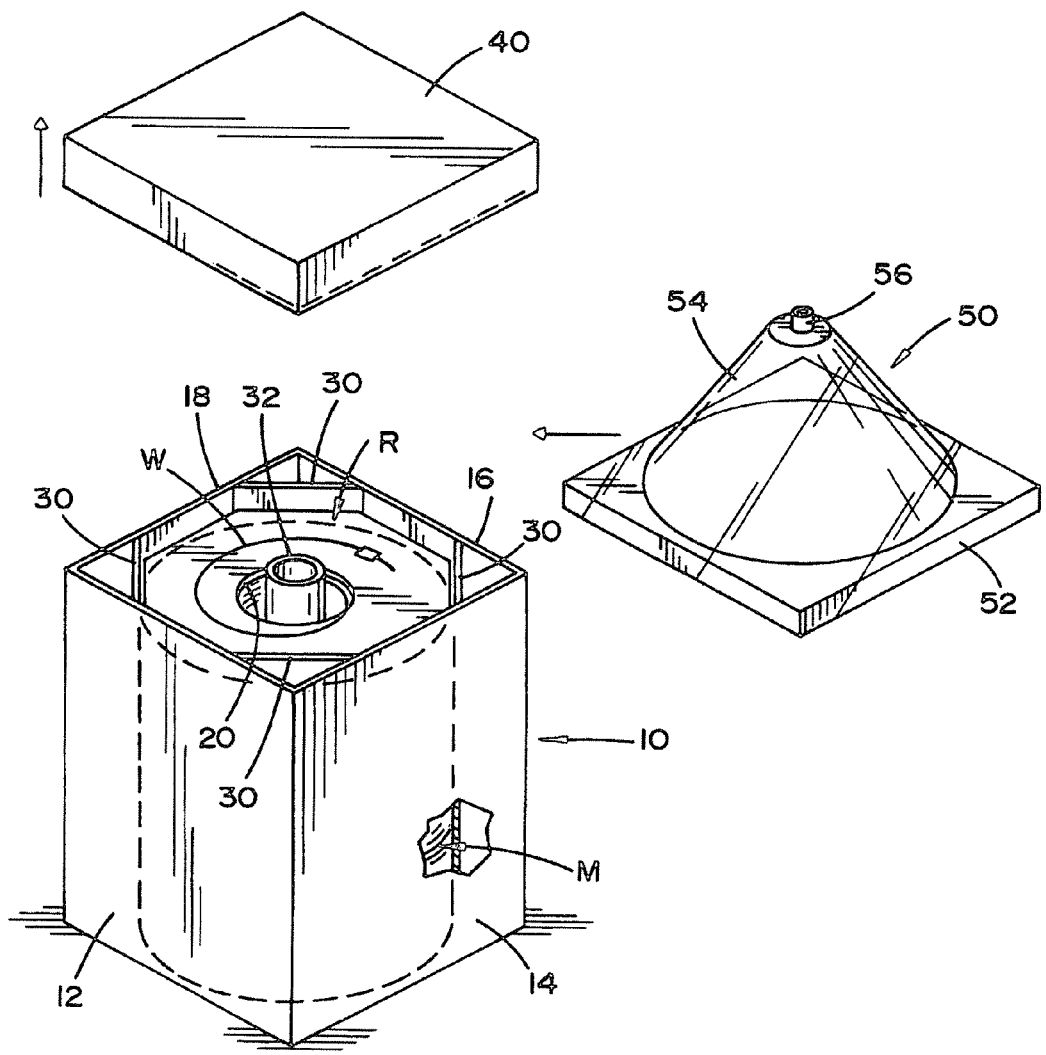
Figure 3:
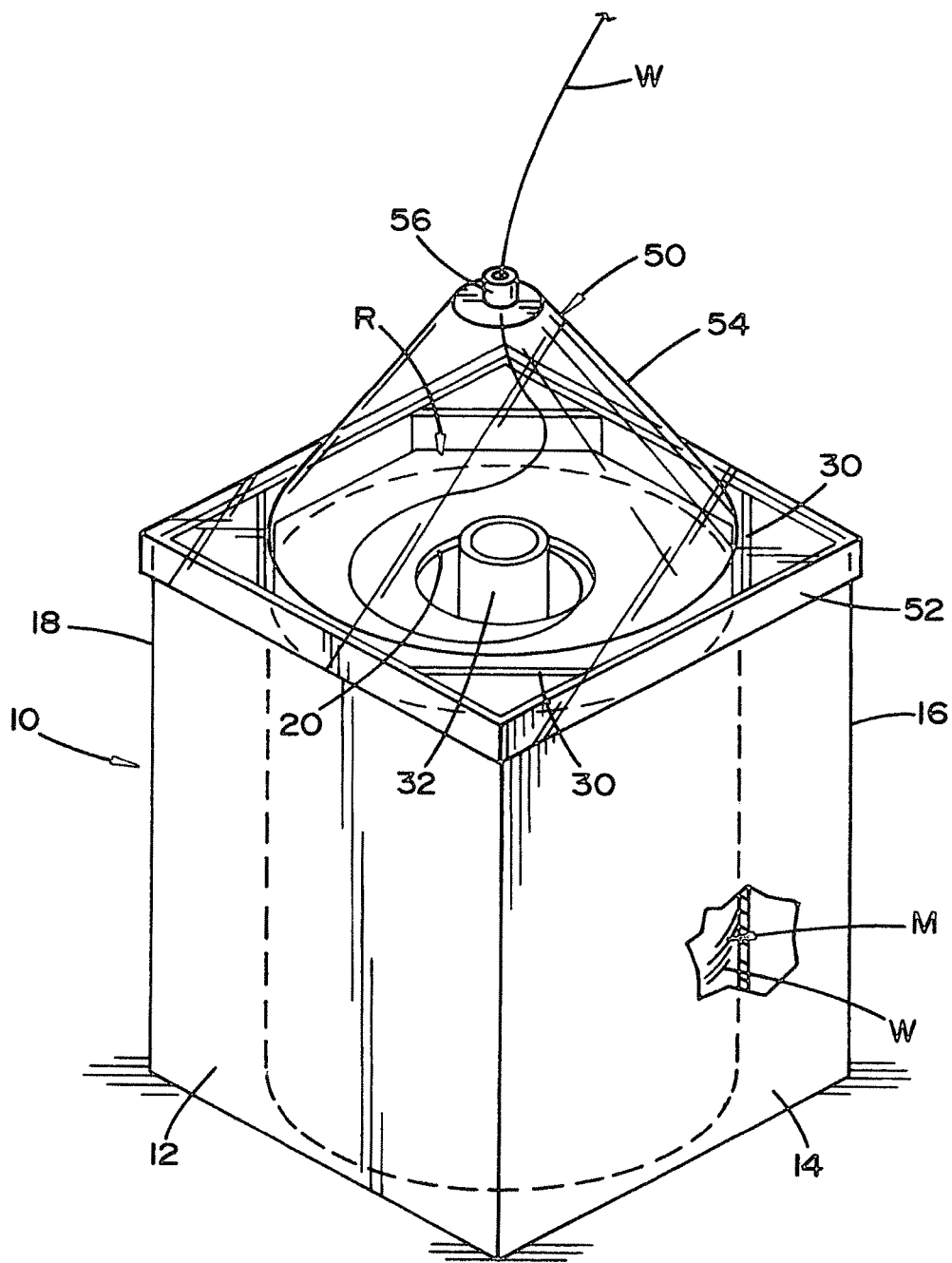

In recent years it has become somewhat common practice to provide a mass M of welding wire W in a cardboard box 10 as shown in FIGS. 1-3. This prior art welding wire box includes an upper flat braking ring R with a central cylindrical opening 20 through which wire W is dispensed or payed out. Box 10 includes four sidewalls 12, 14, 16 and 18 with appropriate corner supports 30 to rigidify the box in a vertical direction and center wing sleeve 32. For shipment, a lid 40 closes the upper opened area of box 10 as shown in FIG. 1. After shipment to the welding facility, box 10 is mounted onto the welding equipment with lid 40 removed and replaced by plastic dispensing hat 50 having a lower square base 52 and a conical dome 54 so dispensing grommet 56 is spaced upwardly above wire mass M and generally aligned with the center of opening 20 and the center core cavity of the wound wire in box 10. Thus, the wire is wound in box 10 which is closed by lid 40 and shipped. When used, the lid is discarded and hat 50 is provided by the ultimate user of the wire. Thus, the user must inventory designated dispensing hats for use with the various boxes of wire being used. This requirement increases the inventory needs at the customer and complicates the conversion of the box into a dispensing container.

Figure 4:
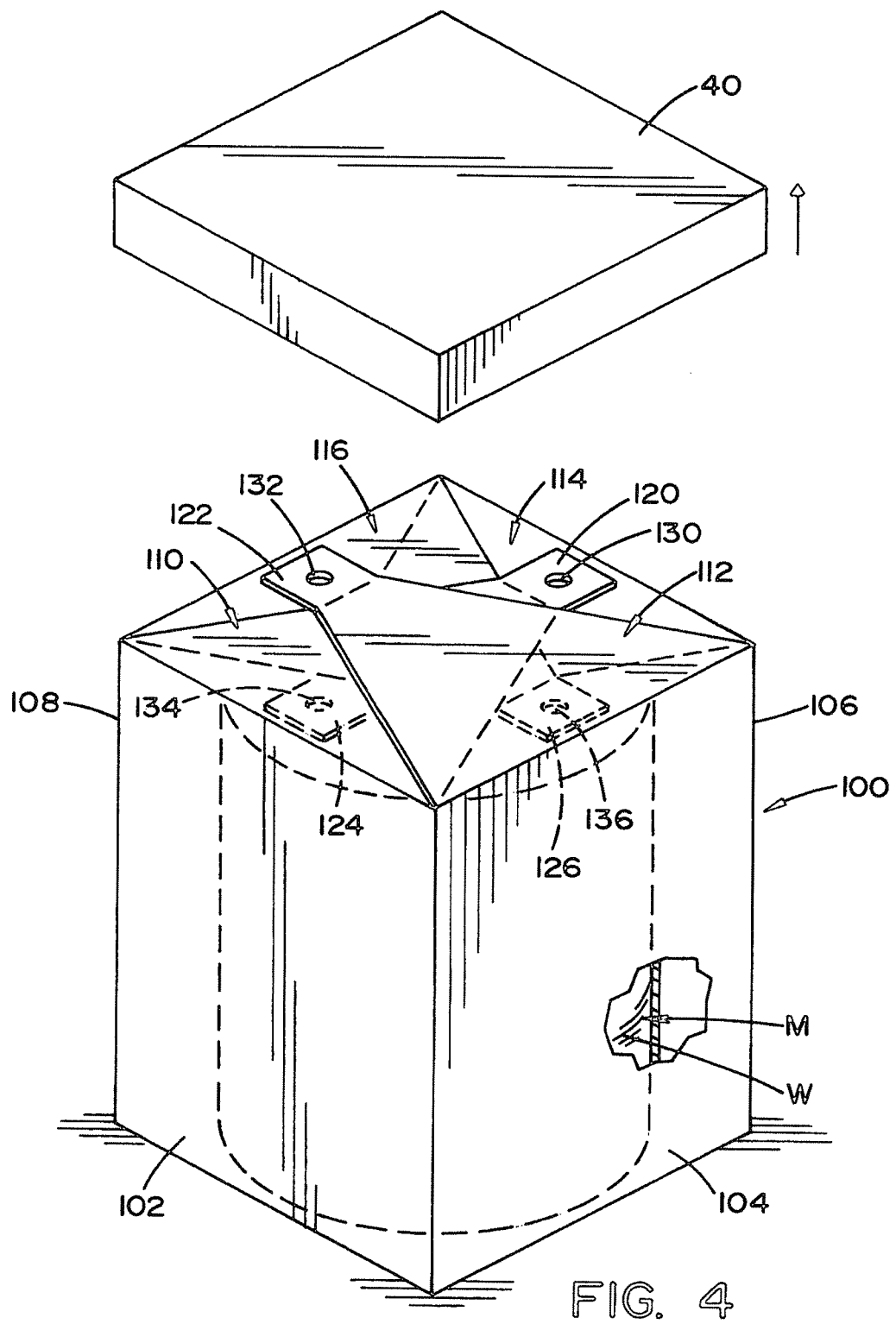
FIG. 4 is a pictorial exploded view of the preferred embodiment of the present invention.
Figure 5:
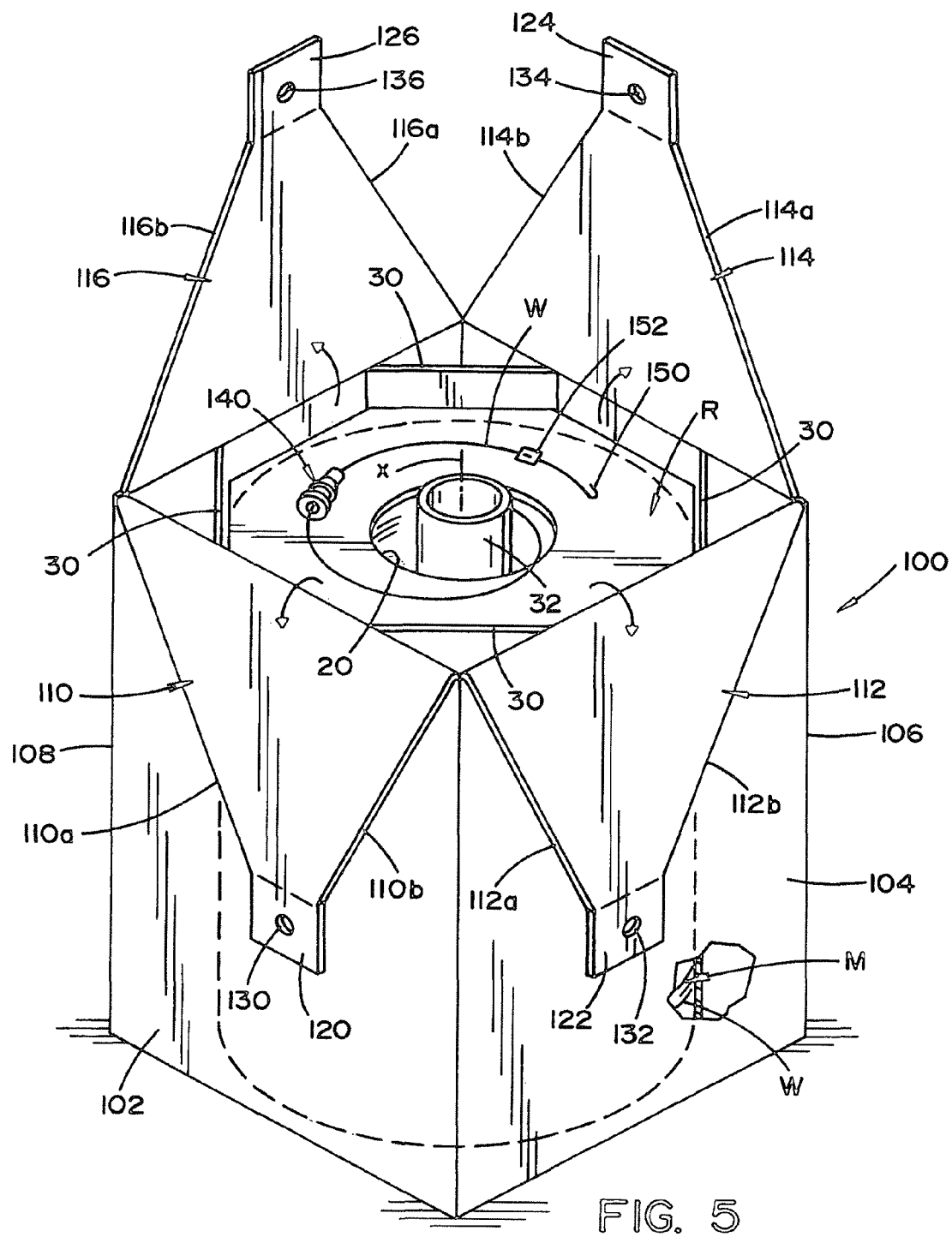
FIG. 5 is a pictorial view of the preferred embodiment of the present invention illustrating the novel box as it is being converted from a shipping container to a dispensing container.
Figure 6:
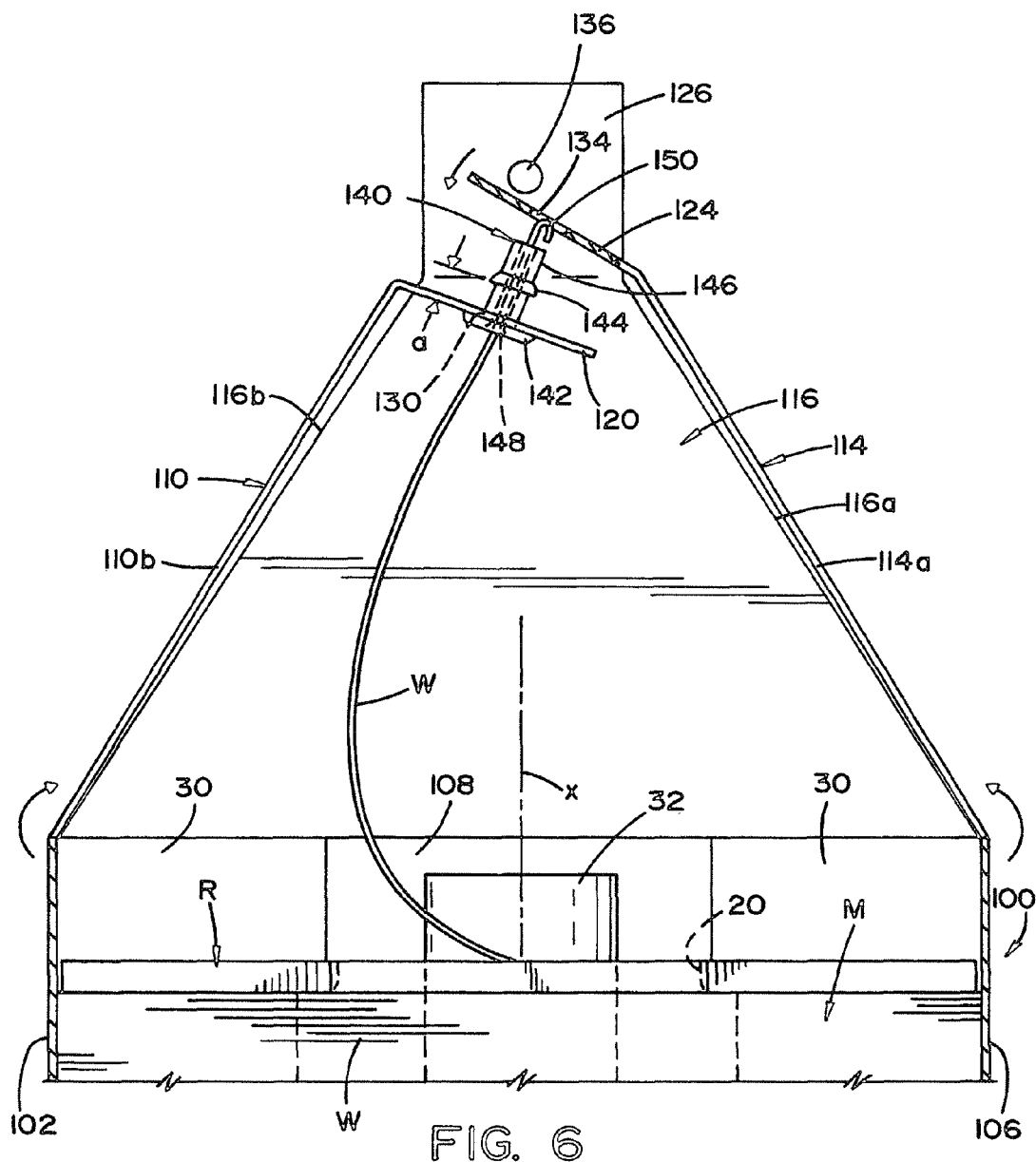
FIG. 6 is an enlarged cross-sectional view showing an initial step in the assembly of the dispensing hat of the novel box.
Figure 7:
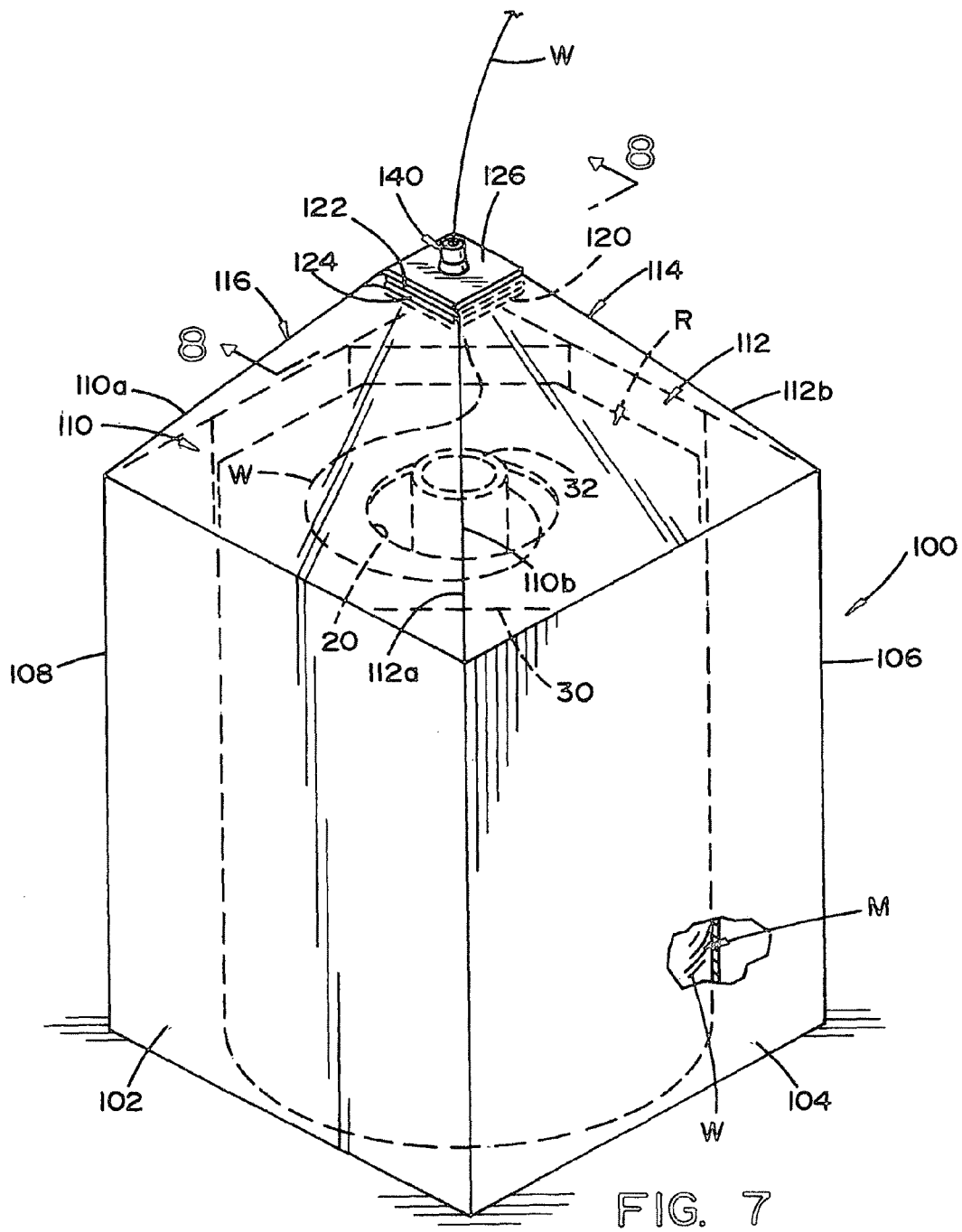
FIG. 7 is a pictorial view of the novel box converted into a dispensing container.
Figure 8:
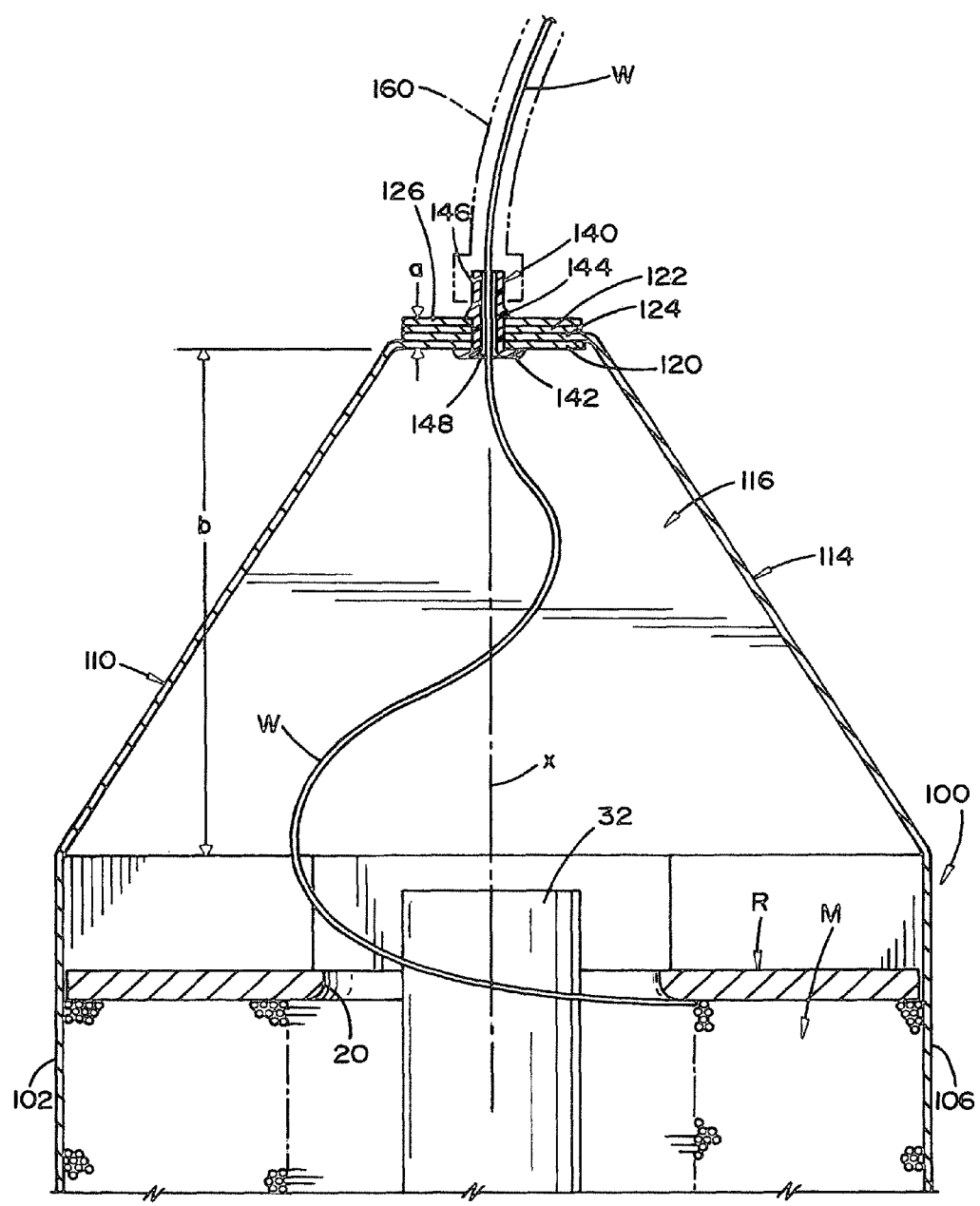
FIG. 8 is an enlarged cross-sectional view taken generally along line 8-8 of FIG. 7.
Figure 9:
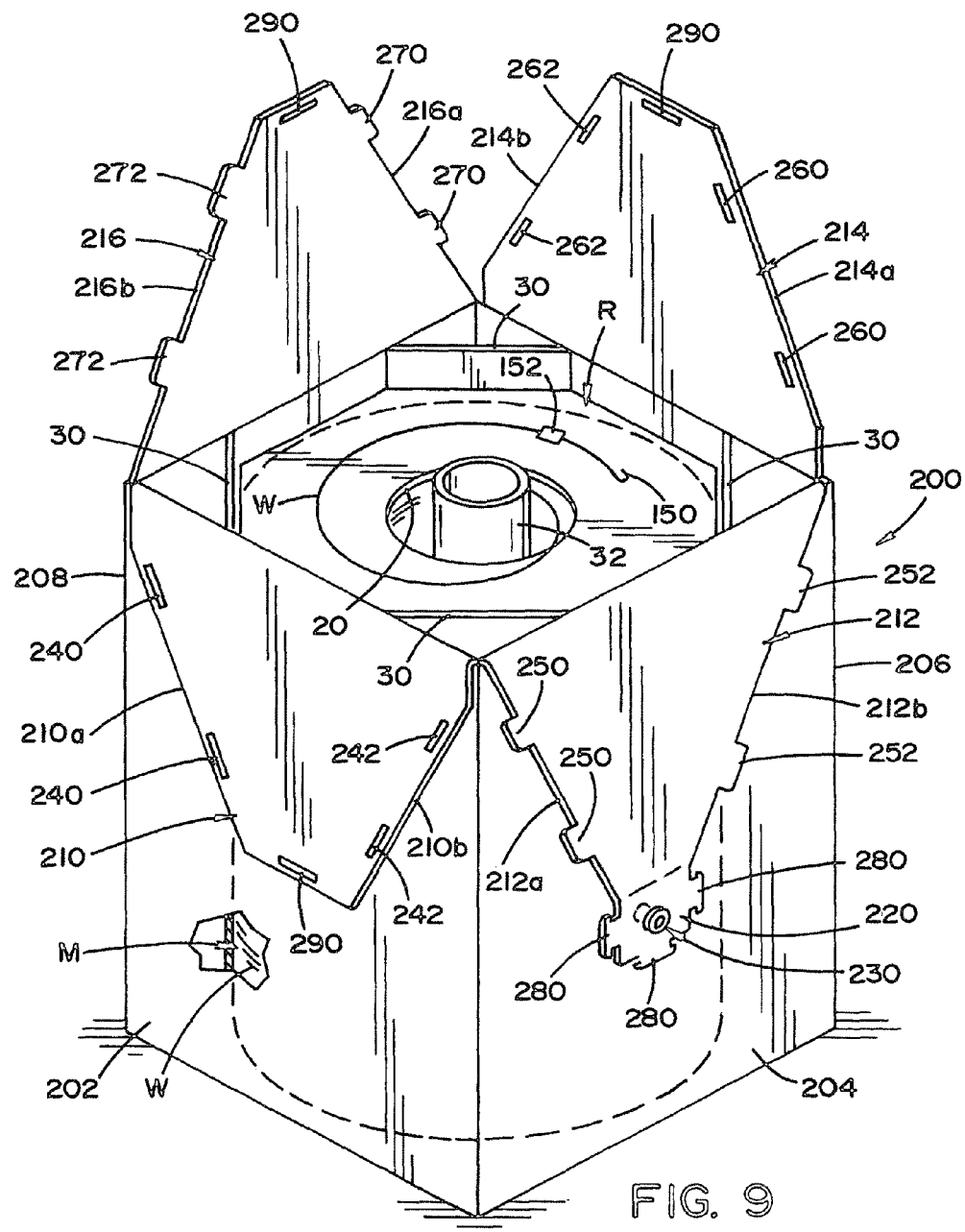
FIG. 9 is a pictorial view of another embodiment of the present invention utilizing interactive flaps for holding the assembled flaps in position.

Returning now to FIGS. 4-8, wherein the showings are for the purpose of illustrating the preferred embodiment of the invention only and not for the purpose of limiting same, box 100 is formed from a single sheet of cardboard material and has a polygonal shape in the form of a square as in box 10. Sidewalls 102, 104, 106 and 108 have integrally formed upwardly extending, truncated triangular flaps 110, 112, 114 and 116, respectively. Each of the triangular shaped flaps has converging angled edges, such as edges 110a and 110b, 112a and 112b, 114a and 114b, and 116a and 116b, and have a truncated top edge 110c, 112c 114c and 116c. The angled edges are ultimately formed in an abutting relationship to create a pyramid configuration or tent at the upper section of box 100. In this configuration, there is a square opening at the top of the pyramid defined by the truncated top edges. This opening is closed by a square crown section attached to one end or truncated edge of one of the triangular flaps. In the preferred embodiment, there are four square crown sections 120, 122, 124 and 126 integrally formed with flanges 110, 112, 114 and 116, respectively. The crown sections each have a wire outlet opening 130, 132, 134 and 136, respectively. When the triangular shaped flaps are assembled into a pyramid, openings 130, 132, 134 and 136 overlap each other and are aligned with central axis x of the cylindrical wire mass M in box 100. After the box is filled with a continuous cylinder of welding wire as previously described, flaps 102-106 are moved into a down position occupying a plane above the wire, as shown in FIG. 4. This is the shipping position of the integrally formed flaps. Wire W has an upper hook 150 and is taped to the top of ring R by strip 152 for stability during shipment. After the flaps are in the down position, shown in FIG. 4, lid 40 closes the box which is then shipped to the facility for use in an automatic welding operation. At the facility, lid 40 is removed and truncated triangular flaps 110-116 are moved to the outer positions shown in FIG. 5 awaiting assembly into a pyramid configuration above the wire. The first step in the assembly procedure is shown in FIG. 6 wherein opposite triangular flaps 110, 114 formed on the top of parallel sidewalls 102, 106 are joined together by an element in the form of plastic grommet 140. This grommet comprises a lower fixed shoulder 142 and an upper camming shoulder 144 defining a space a between the shoulders. An upper nose 146 captures hook 150 for feeding the wire into the welding installation. Grommet 140 is pushed through opening 130 so shoulder 140 rests against the bottom of square crown section 120. Then square crown section 124 integrally formed on the top of triangular flap 114 is snapped over camming shoulder 144 into a space between the fixed shoulder and the camming shoulder. In this manner, upper nose 146 of grommet 140 extends in a vertical direction generally coaxial with axis x of wire mass M. In the broad sense of the invention, as will be explained later, only two flaps 110, 114 could be used and the space a would be generally the total thickness of two square crown sections 120, 124. However, in the preferred embodiment of the present invention, each flap includes an upper square crown section with a wire outlet opening. Thus, after flaps 110, 114 are assembled into an extended triangular configuration, flaps 112 and 116 are snapped over grommet 40 so four layers of overlapping square crown sections are used to rigidify the upper squared opening of the assembled truncated flaps. In the assembled position, the edges of adjacent flaps are generally abutting and the four flaps are formed into a pyramid having a height b as shown in FIG. 8. This height is generally about 12-20 inches. Indeed, the height is greater than 6.0 inches and preferably greater than 12.0 inches. When the final configuration is assembled by shifting the four flaps from the down position shown in FIG. 4 to the assembled configuration shown in FIG. 7, the box is converted from a shipping box to a wire dispensing container. The wire extends through bore 148 and is directed through the standard feeding tube 160 for directing the wire into the welding station. As will be explained later, the square upper section can be occupied by one to four horizontal crown portions. The overlapping crown portions as shown in FIGS. 7 and 8 are held together by grommet 140; however, they can also be held together by adhesive or by a combination of the grommet and an adhesive. After the wire has been exhausted from box 100, the cardboard box is easily discarded even with the central cardboard core 32. The invention is a cardboard box formed from a single sheet of cardboard and having flaps that can be moved from a lower shipping position to an upper position where they are assembled into a tent configuration or a pyramid that constitute a hat on the top of the box.

Figure 10:
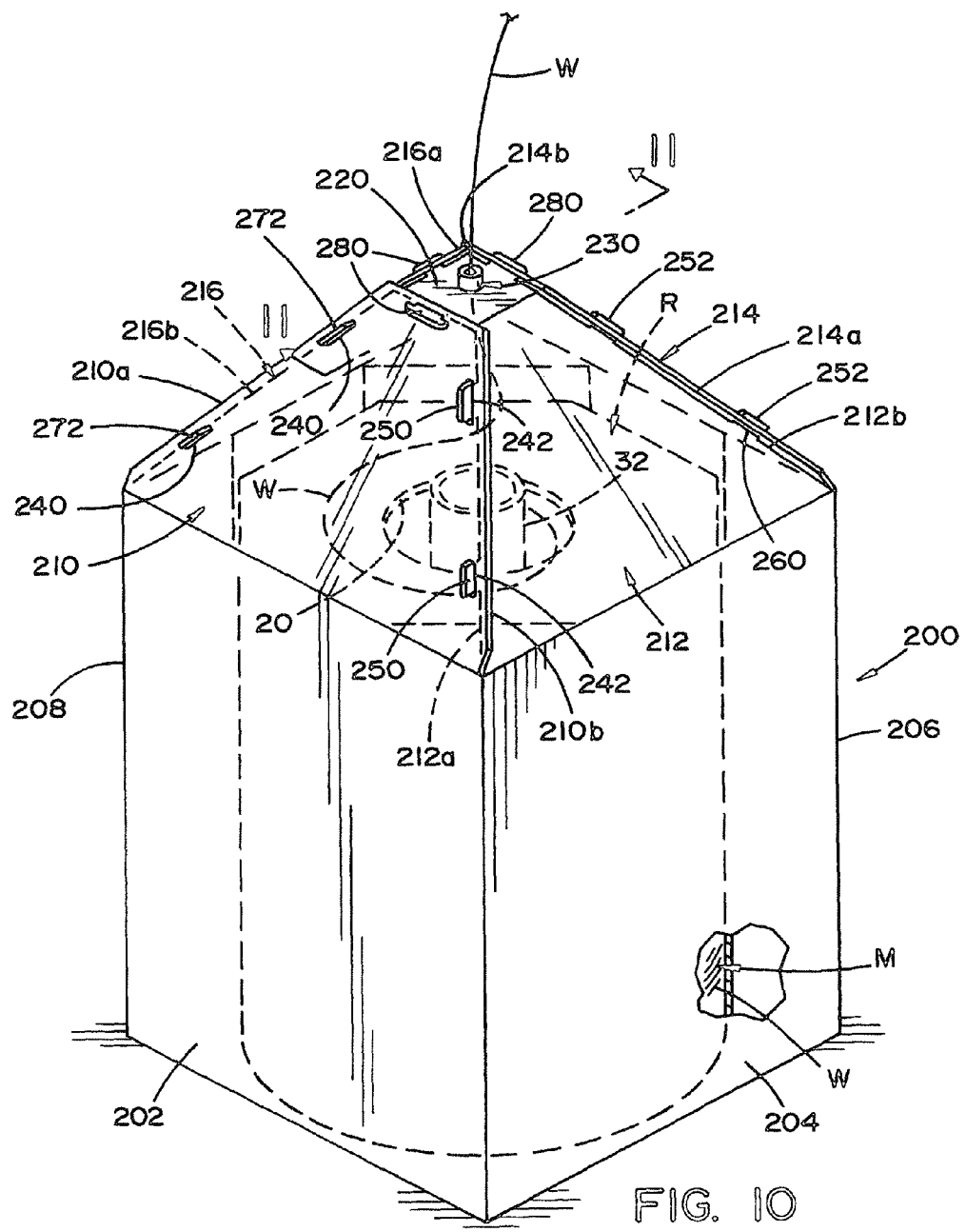
FIG. 10 is a partial view of the upper section of the box with the assembled integral hat converting the box into a dispensing container.
Figure 11:
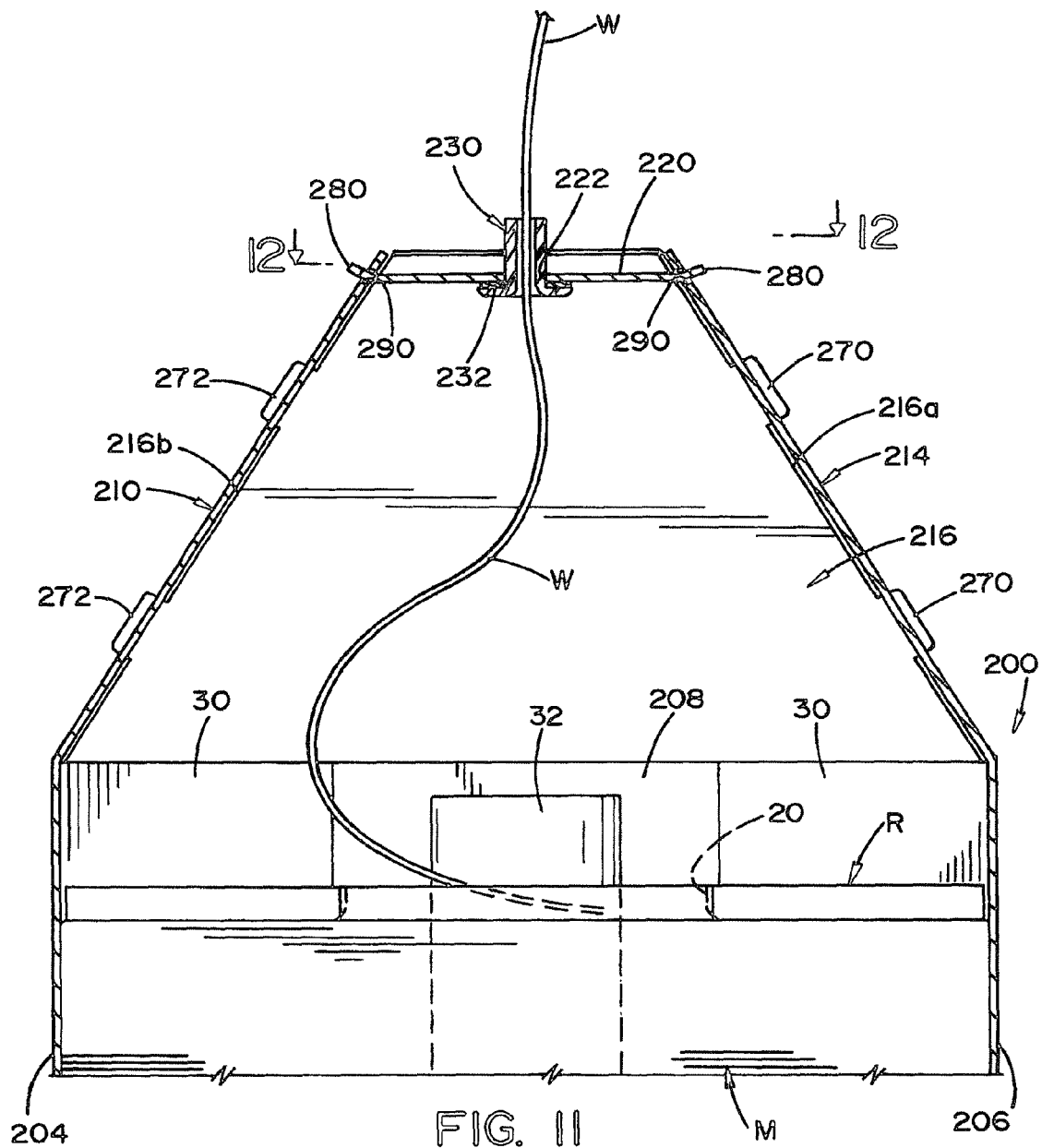
FIG. 11 is an enlarged cross-sectional view taken generally along line 11-11 of FIG. 10.
Figure 12:
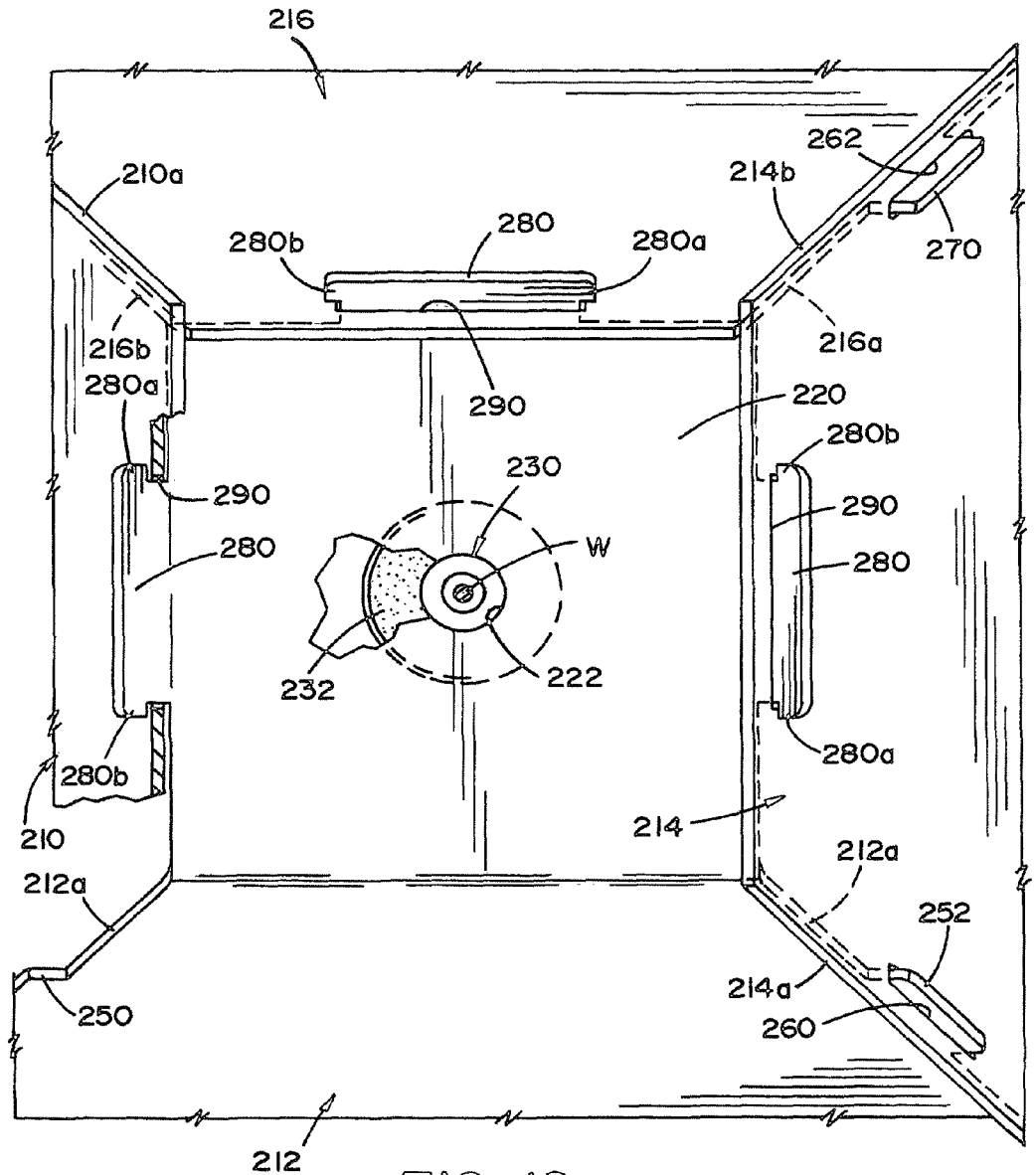
FIG. 12 is an enlarged partial view taken generally along line 12-12 of FIG. 11.

A further embodiment of the present invention is illustrated in FIGS. 9-12 wherein box 200 has sidewalls 202, 204, 206 and 208 where integral, truncated triangular flaps 210, 212, 214 and 216, respectively. The edges of the flaps are 210a and 210b, 212a and 212b, 214a and 214b, and 216a, 216b. When assembled, these edges are abutting to define a pyramid or tent at the upper end of box 200. When assembled the flaps are in the wire dispensing position. The truncated end of one flap 212 is illustrated as having a square crown section 220 that occupies the upper square opening defined by the upstanding triangular flaps when they are assembled in abutting edge-to-edge relationship. The assembly structure for box 200 includes slits 240 in edge 210a and slits 242 in edge 210b. Coacting inter-engaging elements or tabs 250 are provided along edge 212a while engaging tabs 252 are positioned along edge 212b. In a like manner, flap 214 includes slits 260, 262 and flap 260 includes straight tabs 270, 272. The tabs and slits are inter-engaging elements along the abutting edges of the truncated triangular edges as shown in FIGS. 10 and 11. The square crown section 220 integrally formed on the truncated top of flange 212 includes a wire outlet opening 222 and an eyelet 230, best shown in FIG. 11. This eyelet has a flange 234 adhered to the bottom surface of section 220 by an adhesive layer 232. Thus, where crown section 220 is fixed in a horizontal position above the wire mass using interacting tabs 280 having ears 280a, 280b that extend through slits 290 of the other three flaps 210, 214 and 216. To assemble the upper hat of box 200, the flanges are locked together with the combination of tabs and slits, The total assembly is finally locked together by interlocking tabs 280 and slits 290. After assembly, box 200 is converted into a wire dispensing container and operates in accordance with the first embodiment illustrated in FIGS. 4-8.

Figure 13:
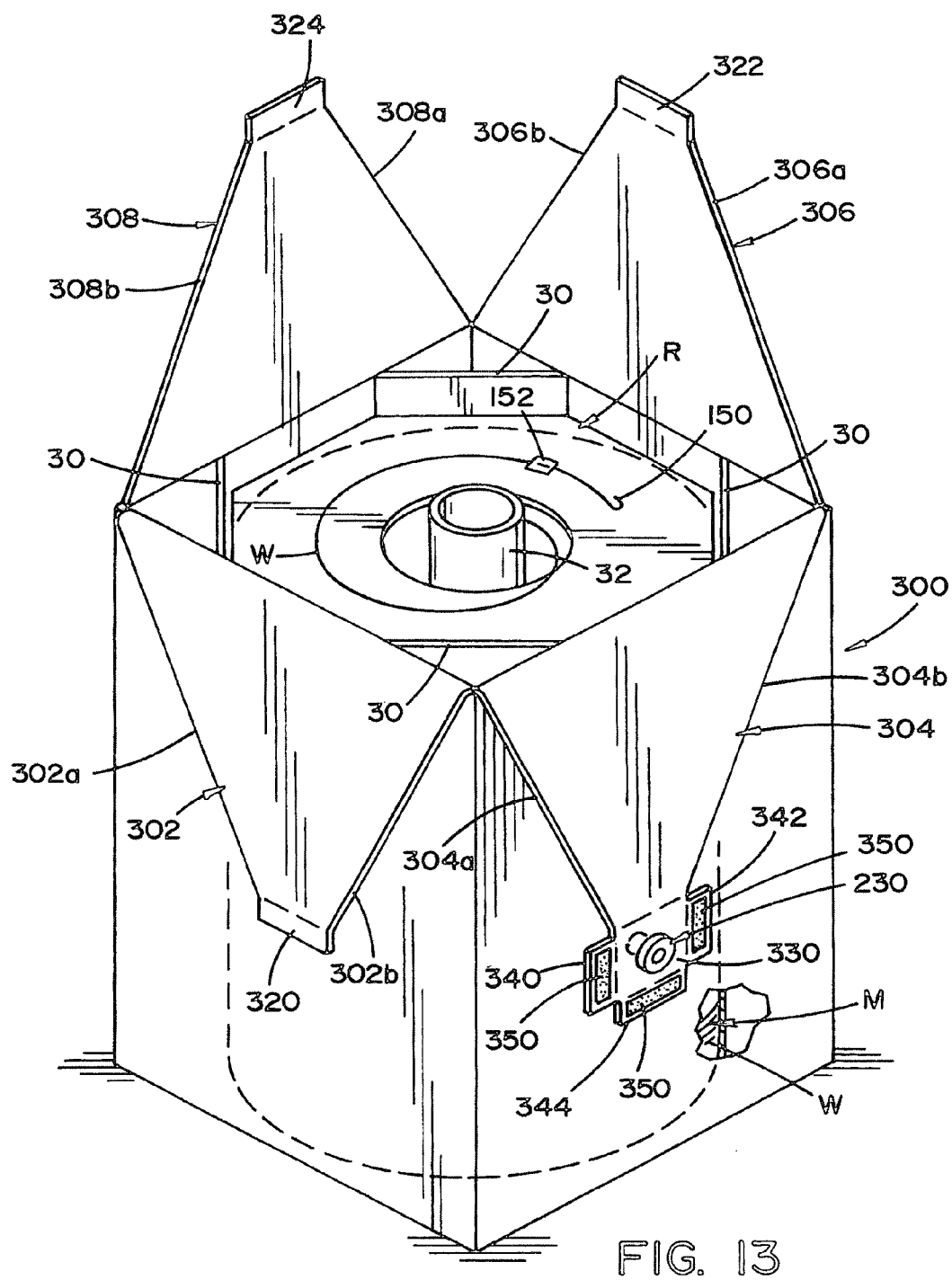
FIG. 13 is a pictorial view similar to FIG. 9 illustrating a modification of the second embodiment of the present invention replacing interactive assembly elements with adhesive assembly elements.
Figure 14:
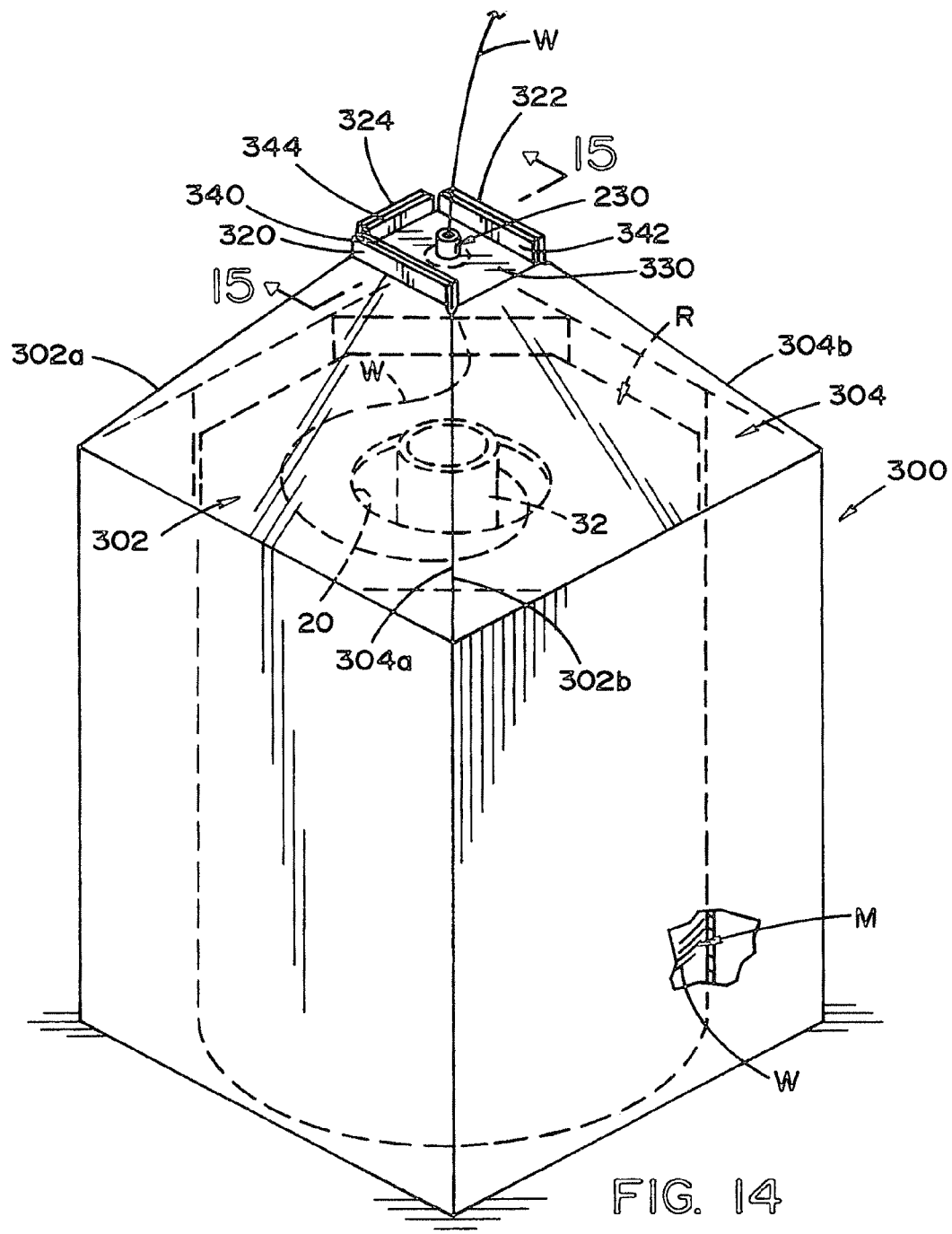
FIG. 14 is a view similar to FIG. 10 illustrating the assembled dispensing hat of the modification shown in FIG. 13 as the box is converted into a dispensing container.
Figure 15:
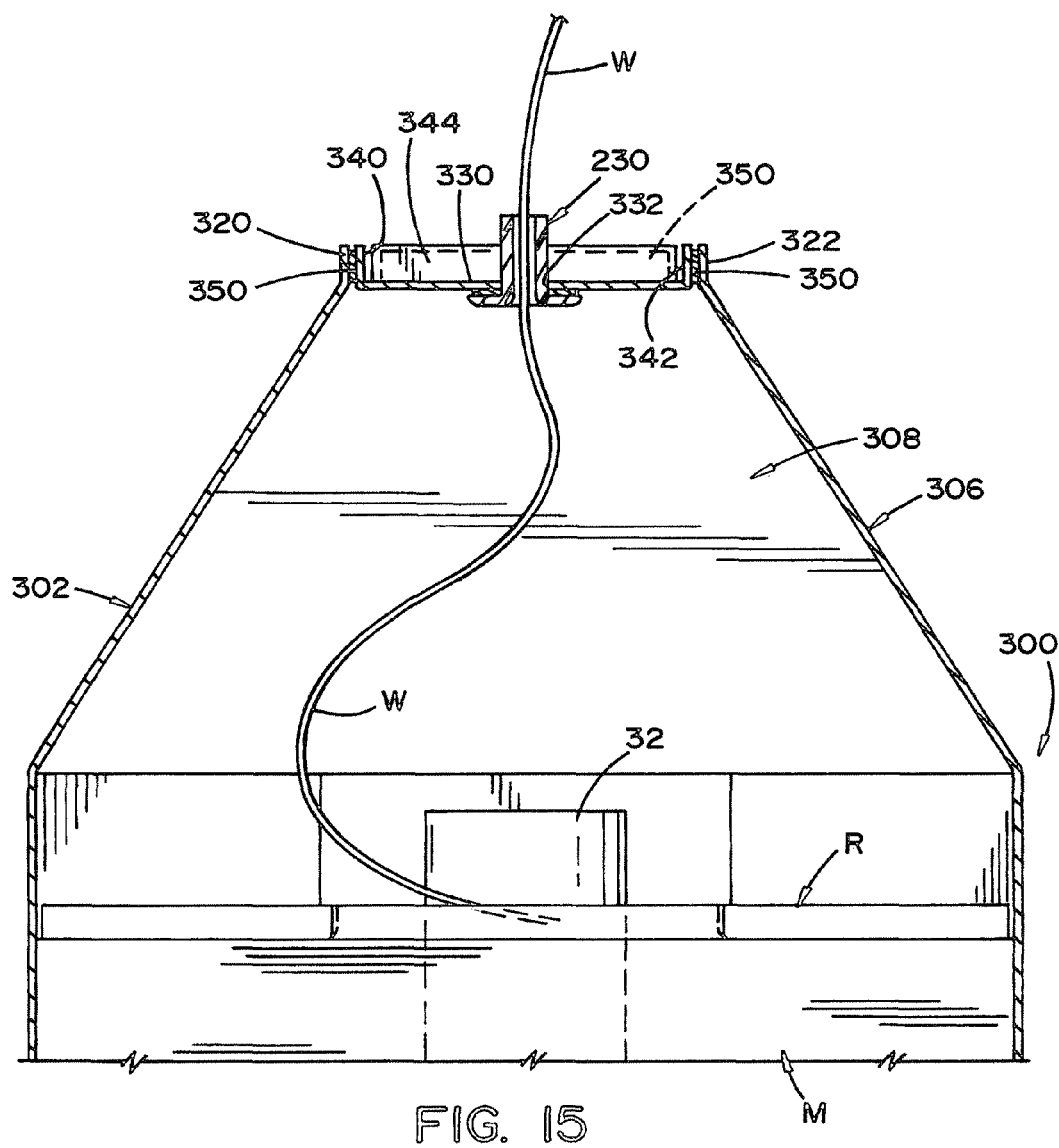
FIG. 15 is an enlarged cross-sectional view taken generally along line 15-15 of FIG. 14.

A slight modification of the embodiment of FIGS. 9-12 is shown in FIGS. 13-15 wherein cardboard box 300 has truncated triangularly shaped flaps 302, 304, 306 and 308 with edges 302a and 302b, 304a and 304b, 306a and 306b, and 308a and 308b. The flaps are truncated as in the other embodiments of the invention and have a lip 320, 322 and 324 on the truncated top of three of the flaps. The other flap is provided with square crown section 330 having a wire outlet opening 332. Three sides of section 330 include lips 340, 342 and 344 adapted to overlie flaps 320, 322 and 324, respectively, when the flaps are moved from the down shipping position to the up assembled position defining a truncated pyramid or tent forming the dispensing hat of box 300. The corresponding lips are held together by strips 350 of double sided tape with eyelet 230 in opening 332. Thus, the cardboard box 300 is converted from a shipping box of the type illustrated generally in FIG. 4 into a wire dispensing container as shown best in FIG. 14. In this manner, a single sheet of corrugated cardboard is die cut to form a box which is used for shipping wire or dispensing wire without the addition of an auxiliary hat or wire feeding implement.

Figure 16:
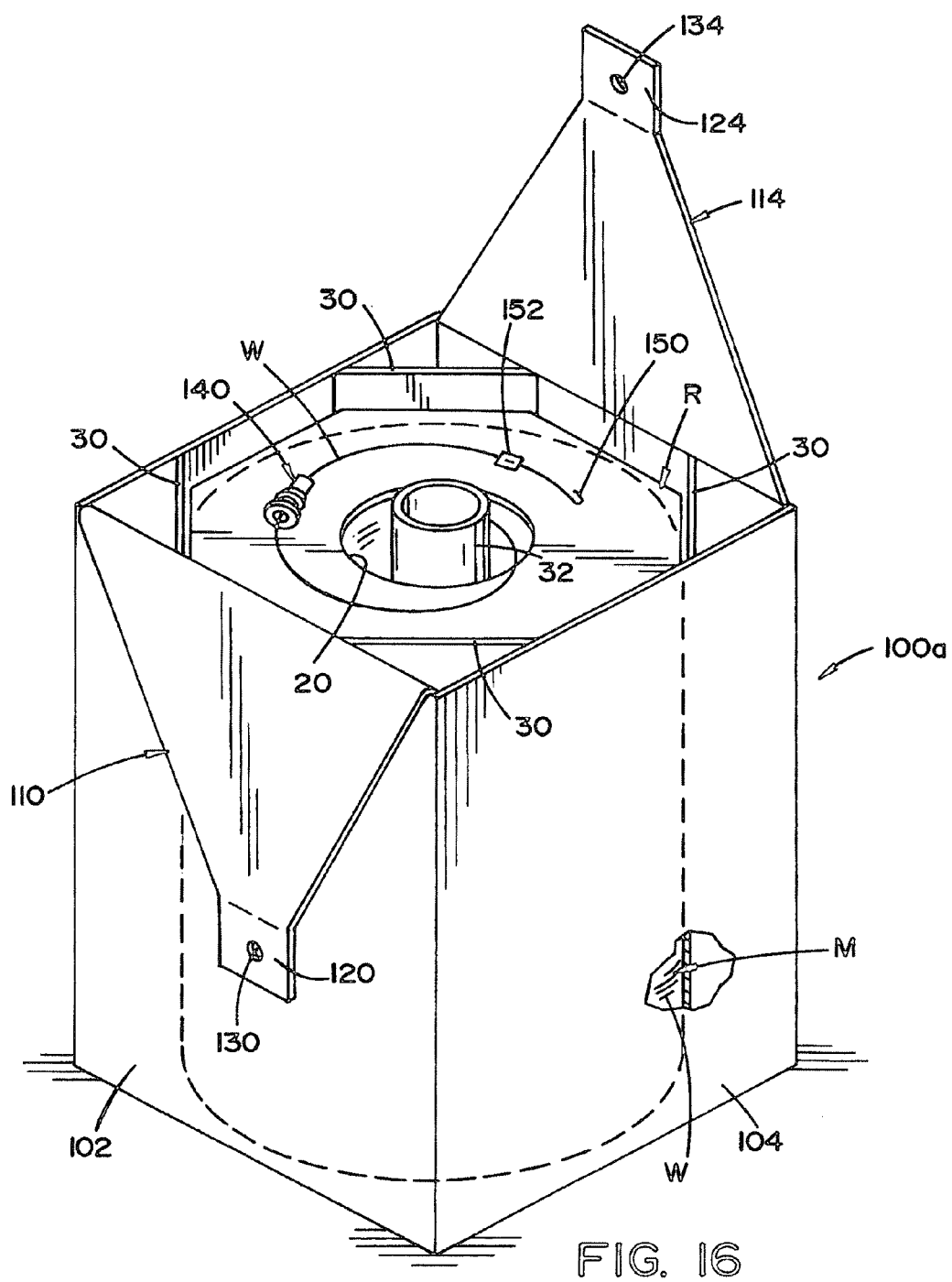
FIG. 16 is a further embodiment of the present invention illustrating a box having less than a full complement of flaps used for converting the box into a dispensing container.
Figure 17:
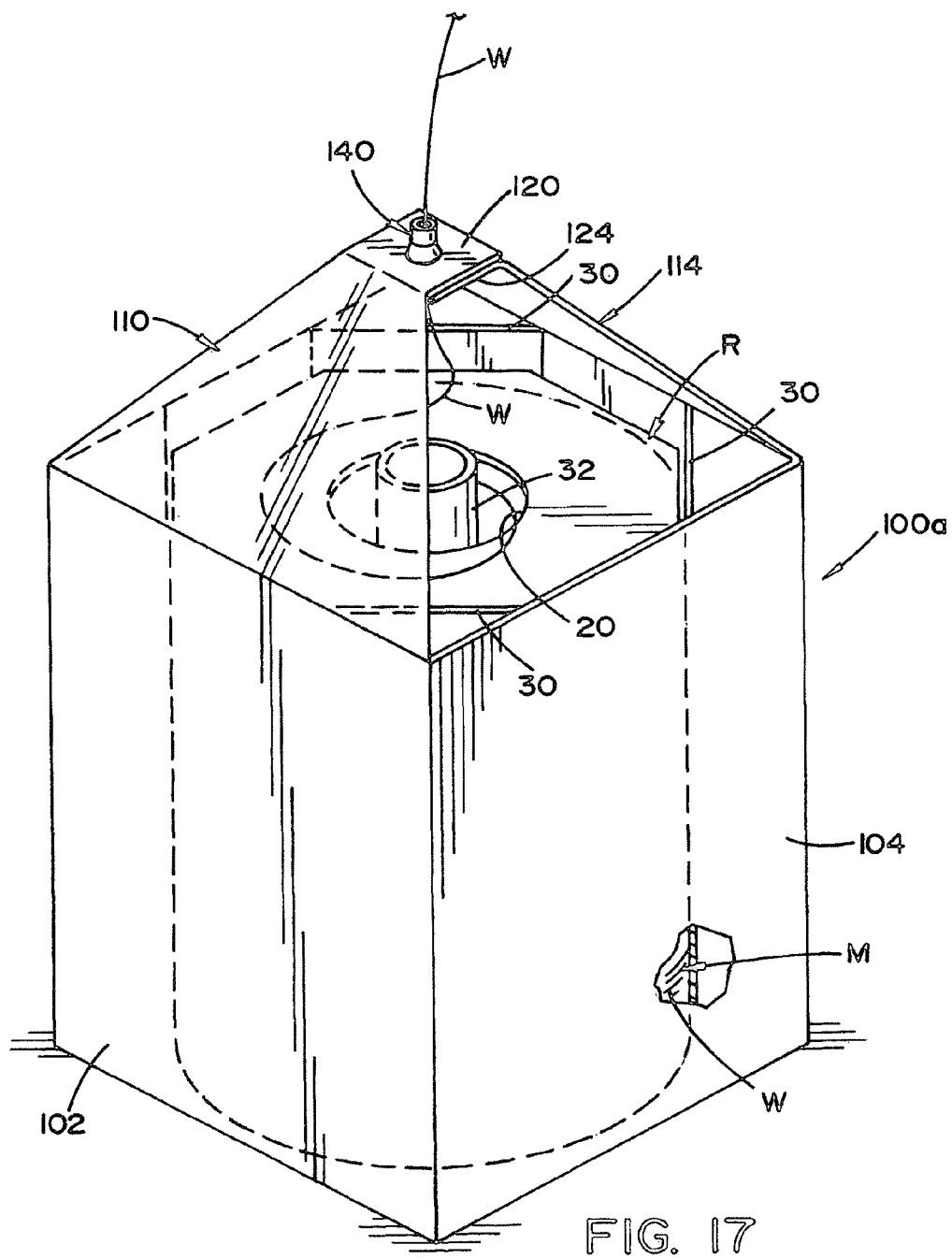
FIG. 17 is a pictorial view of the embodiment shown in FIG. 16 with the integral flaps assembled into a dispensing hat.

The full complement of triangular flaps are not required to practice the invention. Such concept is illustrated in FIGS. 16 and 17 wherein box 100a is similar to the box shown in FIGS. 4-8 except that only two flaps 110, 114 are employed. The top of the box as shown in FIG. 17, includes only two square crown sections 120, 124. In this modified version of box 100, space a between the shoulders on grommet 140 will be reduced to be only slightly greater than twice the thickness of the cardboard. FIGS. 16 and 17 are illustrated to show a broad aspect of the invention and is not the preferred implementation which is shown in FIGS. 4-8.

Figure 18:
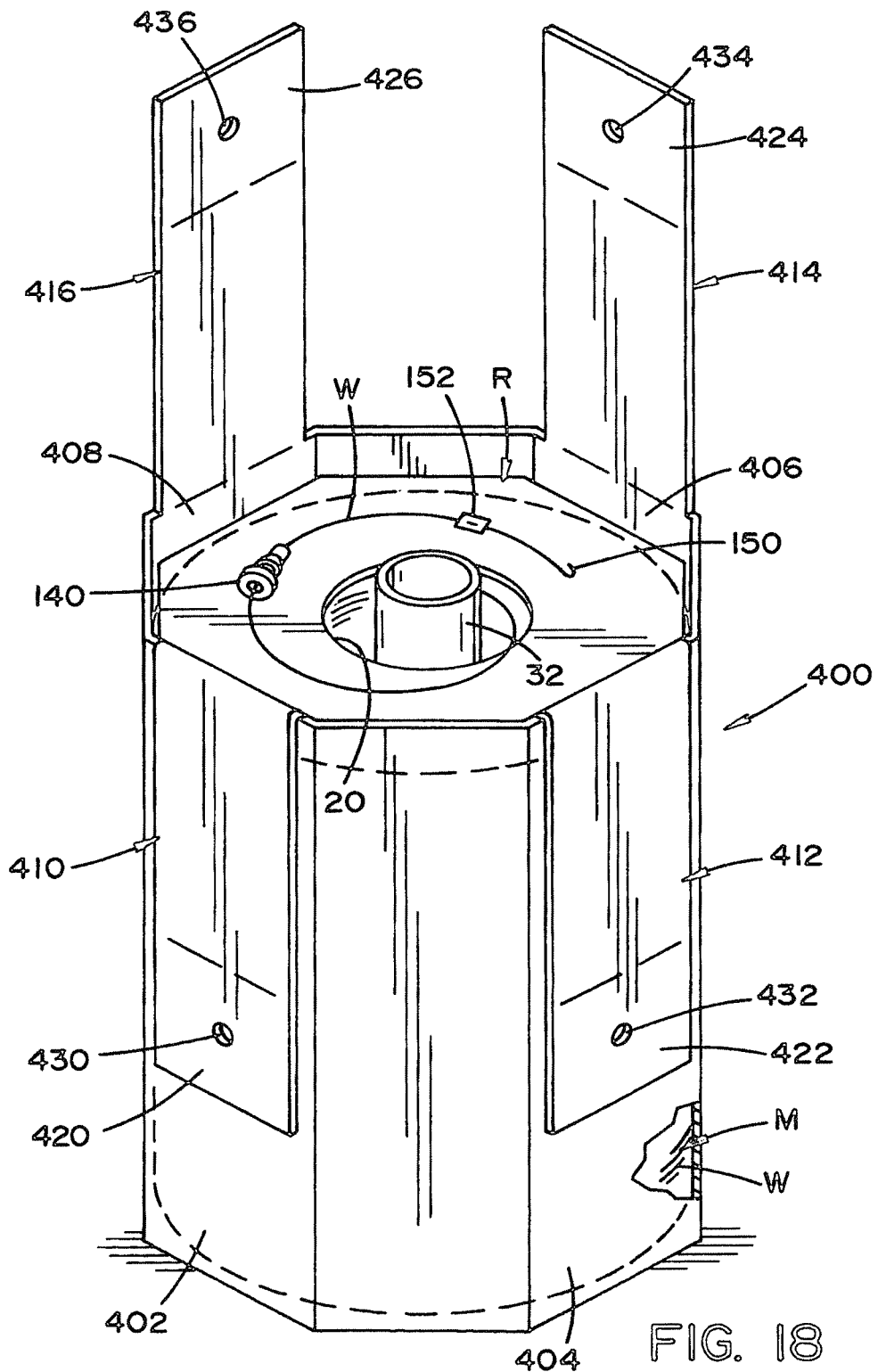
FIG. 18 is still a further modification of the present invention wherein the polygonal box has an octagonal cross-sectional shape with four flaps used to convert the box into a dispensing container.
Figure 19:
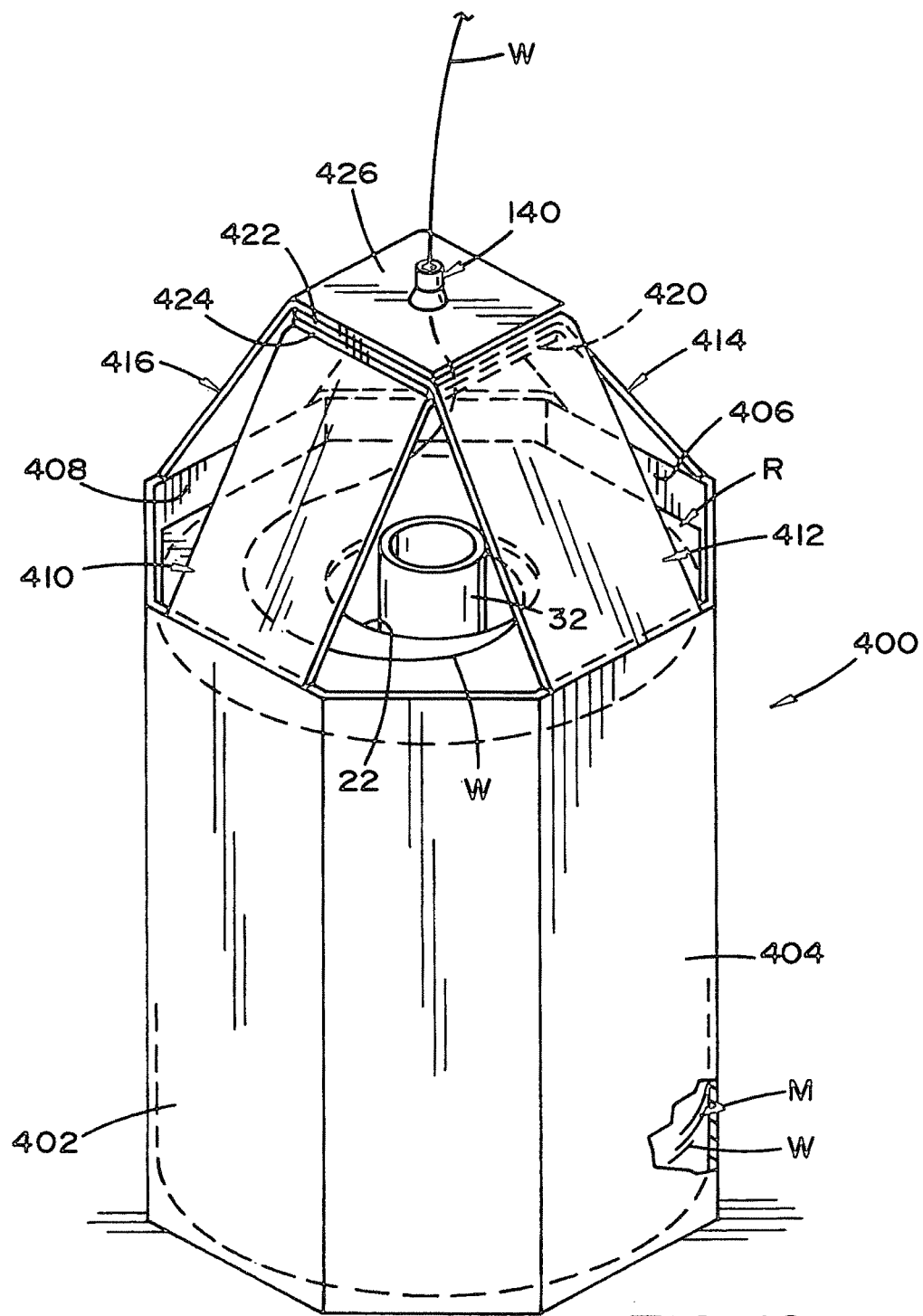
FIG. 19 is a pictorial view of the embodiment shown in FIG. 18 with the flaps assembled to provide an upstanding wire dispensing hat.

To illustrate that the invention can be used on a polygonal box that is not square, FIGS. 18 and 19 are presented. Box 400 has an orthogonal cross-section with four sets of parallel sidewalls. Parallel sidewalls 402, 404 and parallel sidewalls 406, 408 are provided with rectangular integrally formed flaps 410 and 412 and flaps 413 and 416. These flaps are in matched pairs on parallel sidewalls and include a top square crown sections 420, 422, 424 and 426 having wire outlet openings 430, 432, 434 and 436, respectively. When shipping wire in box 400, the integrally formed flaps are placed in a down position and an orthogonal shaped lid is mounted over the box. To convert the box into a dispensing container, the flaps are assembled as previously described with grommet 140 extending through the four layers constituting the thickness of the four crown sections. Grommet 140 holds the section together to define an upper dispensing grommet for wire W when the flaps are in the assembled up position as shown in FIG. 19. As can be seen, the invention can be implemented in a variety of configurations as long as integral flaps lie in a down position for shipping and are movable to an assembled up position to define a dispensing hat on the top of the cardboard box. Other embodiments to use the invention are explained below.

Figure 20:
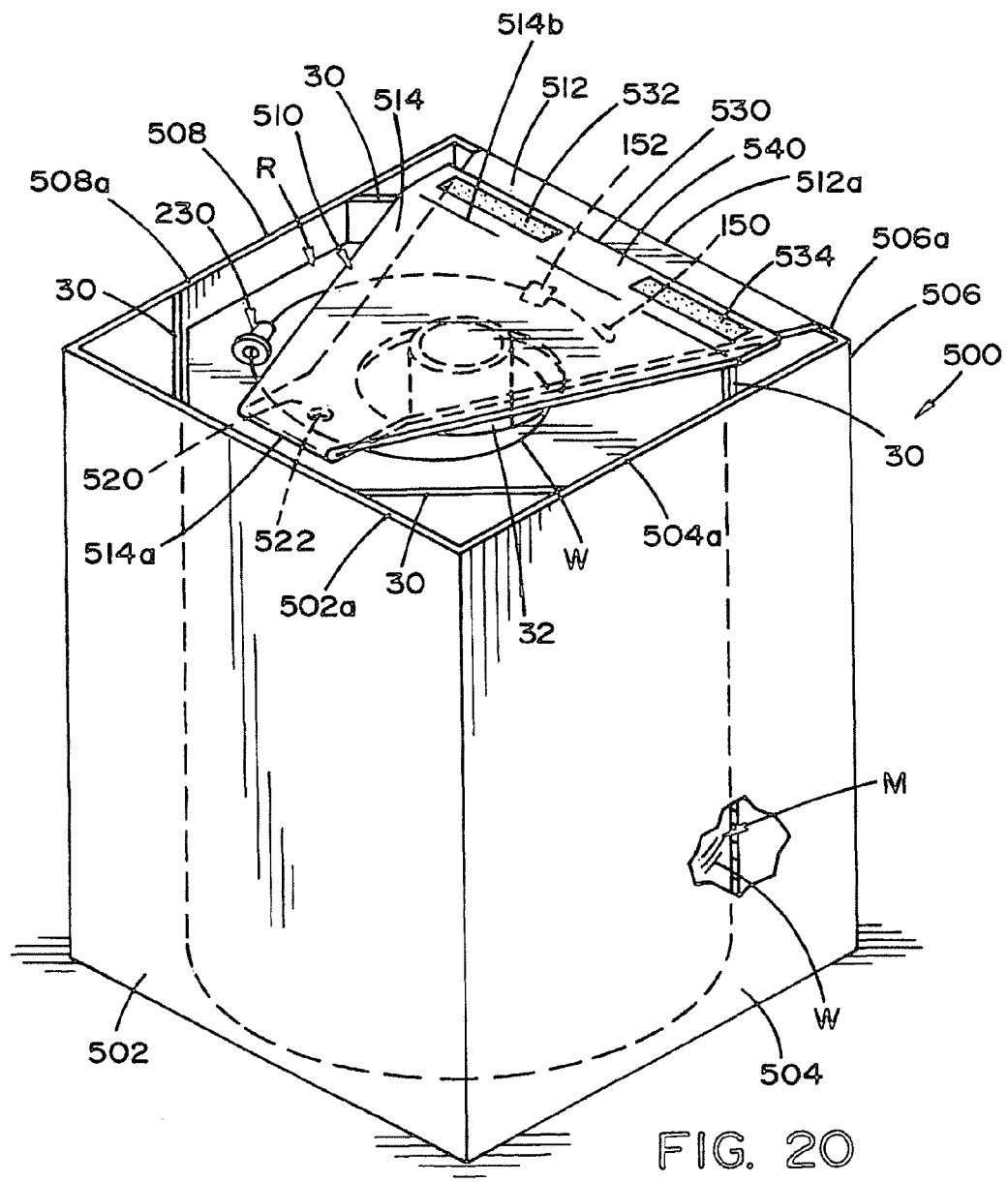
FIG. 20 is a pictorial view of a single flap embodiment of the present invention with the flap collapsed for shipping.
Figure 21:
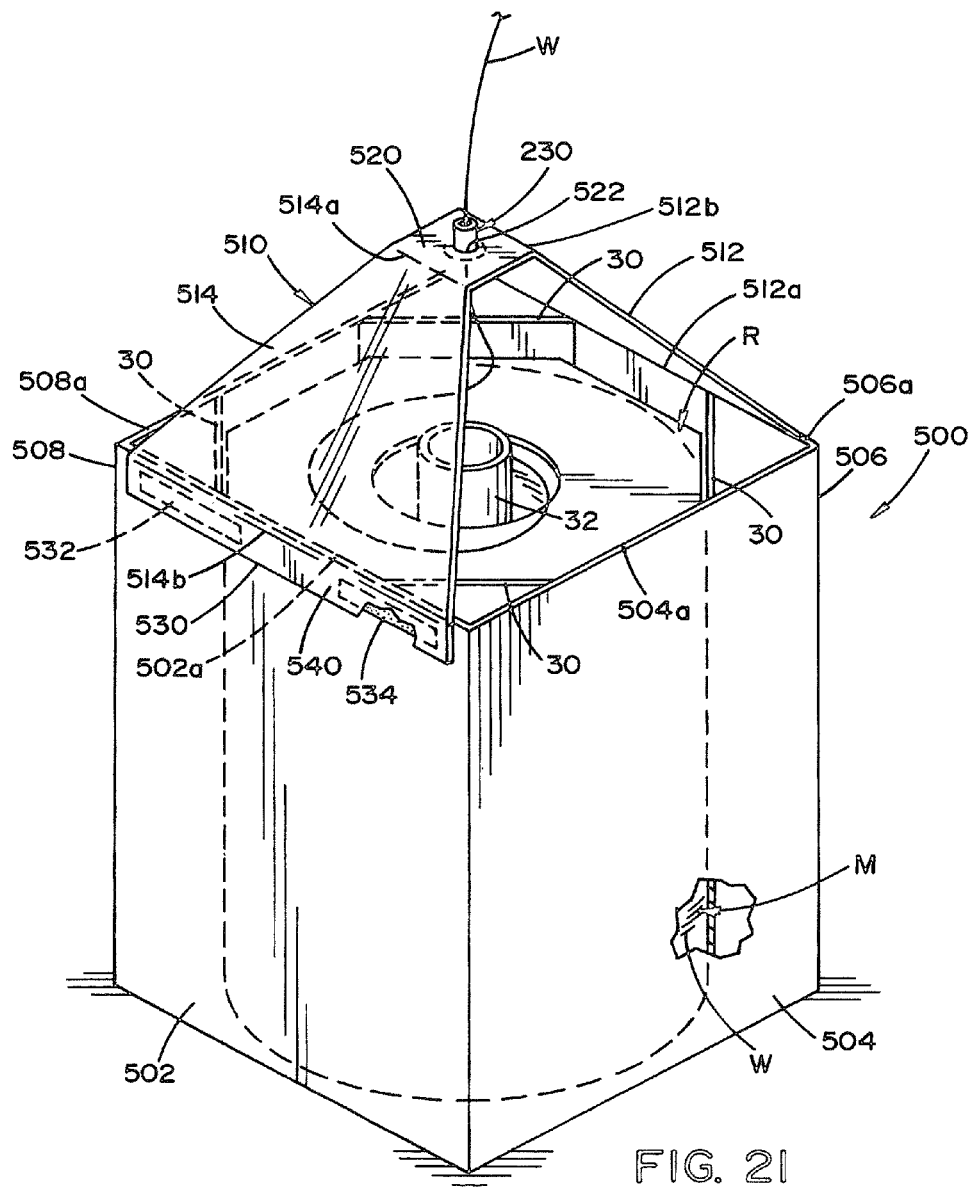
FIG. 21 is a pictorial view of the embodiment shown in FIG. 20 with the flap assembled into a tent configuration.

A single flap embodiment of the invention is shown in FIGS. 20-21 where box 500 contains mass M of wire W wound around core 32. Box 500 is square and has sidewalls 502, 504, 506 and 508 with upper edges 502a, 504a, 506a and 508a, respectively, and a single integrally formed elongated flap 510. Flap 510 comprises flat body section 512, 514 and an intermediate integrally formed, square crown section 520 with wire opening 522 receiving eyelet 230 which is the same as the eyelet 230 shown in FIG. 11. In the preferred embodiment of the single flap version, flat body portions are in the form of truncated triangles with edge 512a of section 512 connected to upper edge 506a of sidewall 506. The opposite smaller edge 512b is merged into square crown section 520 with eyelet 230 mounted in wire opening 522. Body section 514 extends from crown section 520 to a large distal edge 530 having adhesive elements, such as double sided tape strips 532, 534 on tab 540. Tab 540 is bendable at edge 514b of section 514. The folded sown, shipping position of flap 510 is shown in FIG. 20 where the combined length of body section 512 and the width of crown section 520 is less than the distance between parallel side edges 502a, 506a. Section 514 is folded back at edge 514a so tab 540 is spaced inwardly of edge 512a. Lid 40 is placed over the folded single flap for shipping.

To dispense wire W, flap 510 is assembled into the tent configuration shown in FIG. 21 by aligning tab 540 with the top of sidewall 502 and adhering strips 532, 534 onto the top of the sidewall, as shown. Crown section 520 is oriented in an horizontal plane so eyelet 230 guides wire W to the welding operation. Box 500 has an integral structure that is folded for shipment and assembled in an upwardly standing configuration for dispensing welding wire.

Figure 22:
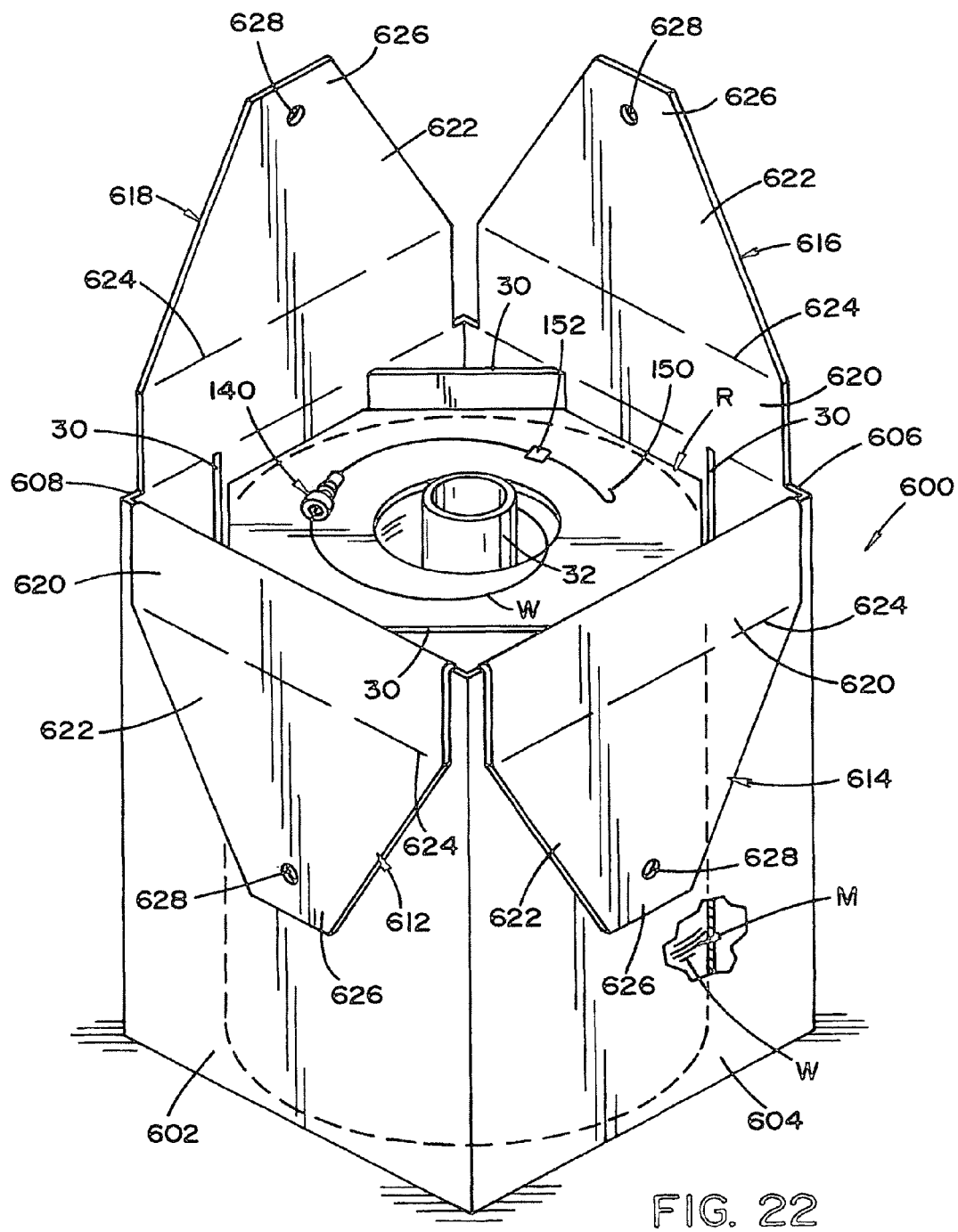
FIG. 22 is a pictorial view of an embodiment of the invention employing flaps to be assembled into an upstanding right angle box configuration; and, FIG. 23 is a pictorial view of the embodiment shown in FIG. 22 with the flaps assembled into an upstanding tent configuration comprising a right angle box shape.
Figure 23:
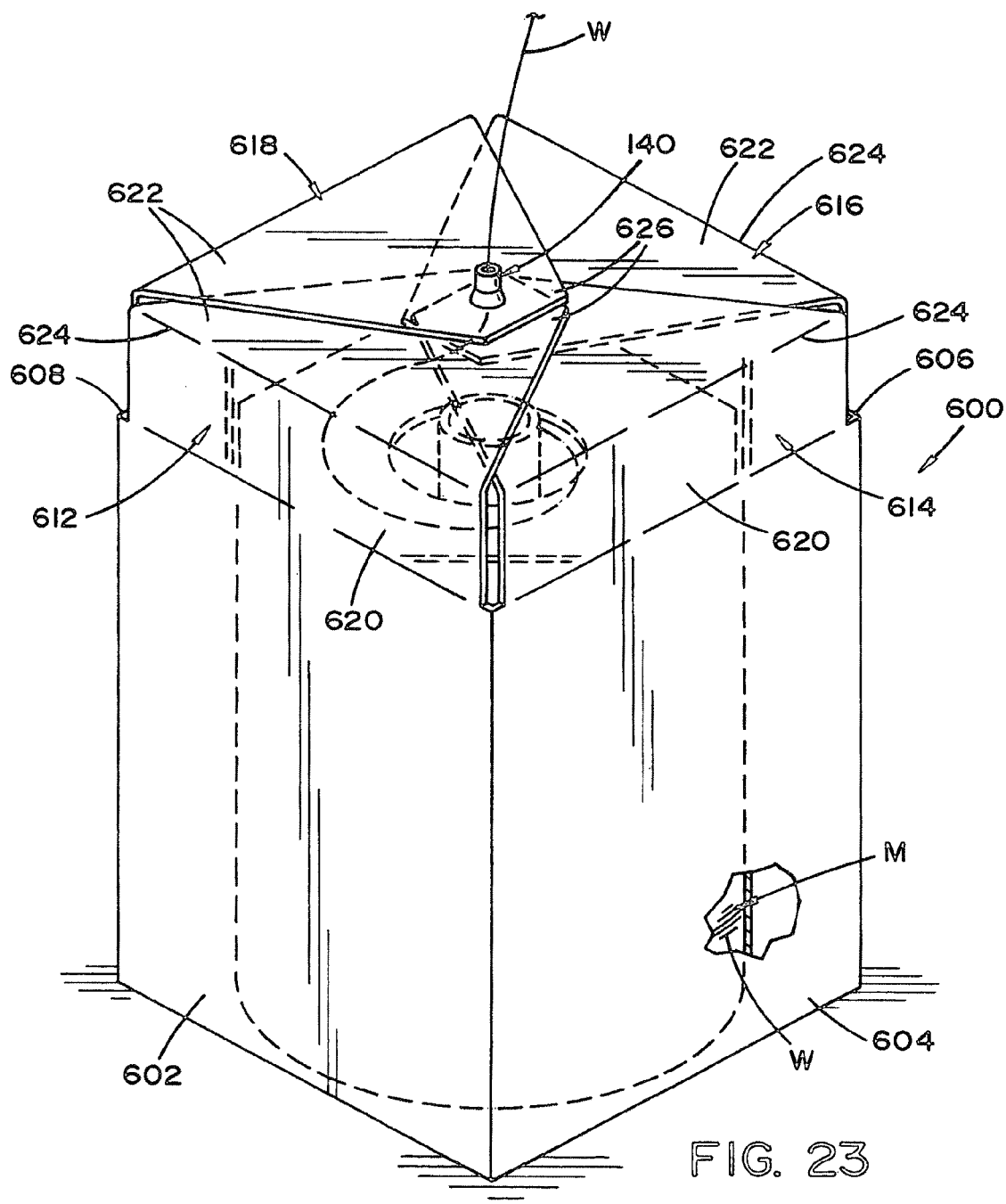

A pyramid shaped tent configuration is preferred for use in the invention; however, it is possible to make the integral flap in such a manner as to create a right angle box shape for the assembled tent configuration. This implementation of the invention is schematically illustrated in FIGS. 22-23. Box 600 has sidewalls 602, 604, 606 and 608 with integrally formed flaps 612, 614, 616 and 618, respectively. Each integral flap has an upright, rectangular section 620, a truncated section 622 bendable with respect to section 620 along line 624. The distal end of the flap has a flat crown section 626 with a wire opening 628. Section 622 and crown section 626 are coplanar. The folded shipping position of the flaps is shown in FIG. 22. At the welding operation the four flaps are assembled by placing sections 620 into a vertical orientation coplanar with the sidewalls. Sections 622, 626 are then folded into overlapping horizontal planes and held together by grommet 140 as shown in FIG. 8. The upper assembled tent configuration is a right angle box shape, but still uses only elements integral with the rest of box 600.

What is claimed is:

1. A box for shipping and dispensing a welding wire wound into a generally cylindrical mass having a cylindrical core cavity concentric with a vertical axis, the box comprising:
    four sidewalls defining a wire receiving compartment, each of the four sidewalls having an integral generally triangular flap with at least two of the four triangular flaps having an upper generally square crown section with a wire outlet opening, said flaps having a folded down position wherein they overlap each other in a flat plane above the wire receiving compartment and an assembled up position defining a four sided pyramid shaped tent above said wire receiving compartment with said crown sections assembled in a plane generally parallel to said flat plane with said crown sections in overlapping relationship; and an element holding said crown sections in said overlapping relationship.

2. A box as defined in claim 1 wherein said height is greater than 6.0 inches.

3. A box as defined in claim 1 wherein said sidewalls are spaced a first distance and said flaps have a length substantially greater than one half said first distance.

4. A box as defined in claim 1 wherein said element is a tubular grommet extending through said wire openings with a lower fixed shoulder and a spaced camming shoulder to capture said crown sections between said shoulders so said grommet can guide said wire as it is dispensed.

5. A box as defined in claim 1 wherein said box is formed from a single sheet of material.

6. A box as defined in claim 5 wherein said material is cardboard.

7. A box as defined in claim 6 wherein said cardboard is corrugated.

* * * * *